United States Patent
Auyeung et al.

(10) Patent No.: US 10,339,841 B2
(45) Date of Patent: *Jul. 2, 2019

(54) LIGHTING ASSEMBLY WITH MULTIPLE LIGHTING UNITS

(71) Applicant: Ultravision Technologies, LLC, Dallas, TX (US)

(72) Inventors: David Siucheong Auyeung, Carrollton, TX (US); William Y. Hall, Dallas, TX (US); Simon Magarill, Mountain View, CA (US)

(73) Assignee: Ultravision Technologies, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/939,565

(22) Filed: Mar. 29, 2018

(65) Prior Publication Data

US 2018/0218653 A1   Aug. 2, 2018

Related U.S. Application Data

(63) Continuation of application No. 15/676,823, filed on Aug. 14, 2017, now Pat. No. 9,947,248, which is a (Continued)

(51) Int. Cl.
*F21K 9/60* (2016.01)
*F21S 6/00* (2006.01)
(Continued)

(52) U.S. Cl.
CPC ............... *G09F 13/22* (2013.01); *F21K 9/60* (2016.08); *F21S 6/006* (2013.01); *F21V 5/007* (2013.01);
(Continued)

(58) Field of Classification Search
None
See application file for complete search history.

(56) References Cited

U.S. PATENT DOCUMENTS 2,254,961 A   9/1941   Lawrence et al.
4,235,285 A   11/1980   Johnson et al.
(Continued)

FOREIGN PATENT DOCUMENTS

CA   2615706 A1   9/2006
CN   201925854 U   8/2011
(Continued)

OTHER PUBLICATIONS

"General Catalog—2012," Thorlux Lighting, Dec. 2012, 164 pages.
(Continued)

*Primary Examiner* — Alexander K Garlen
(74) *Attorney, Agent, or Firm* — Slater Matsil, LLP

(57) ABSTRACT

A method can be used to illuminate a surface that includes a number of non-overlapping portions. The method includes simultaneously illuminating each of the portions so that the surface is substantially uniformly lit. Each portion is illuminated by a respective lighting assembly. Each lighting assembly includes a plurality of LEDs and a plurality of optical elements proximate the plurality of LEDs. For each lighting assembly, when all LEDs of the lighting assembly are operating, the entire portion of the surface is illuminated with an illumination level and a uniformity. Failure of one or more LEDs of the lighting assembly will cause the illumination level of light impinging the portion of the surface to decrease while the uniformity of light impinging the portion of the surface remains substantially the same.

23 Claims, 13 Drawing Sheets

Related U.S. Application Data continuation of application No. 15/162,278, filed on May 23, 2016, now Pat. No. 9,734,737, which is a continuation of application No. 14/992,680, filed on Jan. 11, 2016, now Pat. No. 9,349,307, which is a continuation of application No. 14/635,907, filed on Mar. 2, 2015, now Pat. No. 9,234,642, which is a continuation of application No. 13/836,517, filed on Mar. 15, 2013, now Pat. No. 8,974,077.

(60) Provisional application No. 61/677,346, filed on Jul. 30, 2012.

(51) Int. Cl.

| | | |
|---|---|---|
| *F21V 5/00* | (2018.01) | |
| *F21V 19/00* | (2006.01) | |
| *F21V 21/26* | (2006.01) | |
| *F21V 23/00* | (2015.01) | |
| *F21V 29/00* | (2015.01) | |
| *F21V 29/15* | (2015.01) | |
| *F21V 29/70* | (2015.01) | |
| *F21V 29/74* | (2015.01) | |
| *F21V 29/76* | (2015.01) | |
| *F21V 29/83* | (2015.01) | |
| *F21V 29/89* | (2015.01) | |
| *F21V 31/00* | (2006.01) | |
| *F21V 33/00* | (2006.01) | |
| *G02B 19/00* | (2006.01) | |
| *G09F 13/02* | (2006.01) | |
| *G09F 13/22* | (2006.01) | |
| *G09F 15/00* | (2006.01) | |
| *F21V 29/503* | (2015.01) | |
| *F21W 131/10* | (2006.01) | |
| *F21W 131/40* | (2006.01) | |
| *F21Y 101/00* | (2016.01) | |
| *F21Y 105/10* | (2016.01) | |
| *F21Y 105/12* | (2016.01) | |
| *F21Y 105/16* | (2016.01) | |
| *F21Y 115/10* | (2016.01) | |

(52) U.S. Cl.
CPC ............ *F21V 19/003* (2013.01); *F21V 21/26* (2013.01); *F21V 23/002* (2013.01); *F21V 29/00* (2013.01); *F21V 29/15* (2015.01); *F21V 29/503* (2015.01); *F21V 29/70* (2015.01); *F21V 29/74* (2015.01); *F21V 29/745* (2015.01); *F21V 29/76* (2015.01); *F21V 29/763* (2015.01); *F21V 29/83* (2015.01); *F21V 29/89* (2015.01); *F21V 31/00* (2013.01); *F21V 31/005* (2013.01); *F21V 33/00* (2013.01); *G09F 13/02* (2013.01); *G09F 15/00* (2013.01); *G09F 15/005* (2013.01); *G09F 15/0037* (2013.01); *F21W 2131/10* (2013.01); *F21W 2131/40* (2013.01); *F21Y 2101/00* (2013.01); *F21Y 2105/10* (2016.08); *F21Y 2105/12* (2016.08); *F21Y 2105/16* (2016.08); *F21Y 2115/10* (2016.08); *G02B 19/0014* (2013.01); *G02B 19/0028* (2013.01); *G02B 19/0061* (2013.01); *G02B 19/0066* (2013.01); *G09F 2013/222* (2013.01)

(56) References Cited

U.S. PATENT DOCUMENTS

| | | |
|---|---|---|
| 4,679,118 A | 7/1987 | Johnson et al. |
| 5,036,248 A | 7/1991 | McEwan et al. |
| 5,083,194 A | 1/1992 | Bartilson |
| 5,329,426 A | 7/1994 | Villani |
| 5,384,940 A | 1/1995 | Soule et al. |
| 5,803,579 A | 9/1998 | Turnbull et al. |
| 5,818,640 A | 10/1998 | Watanabe et al. |
| 5,857,767 A | 1/1999 | Hochstein |
| 5,896,093 A | 4/1999 | Sjoborn |
| 5,924,788 A | 7/1999 | Parkyn, Jr. |
| 5,926,320 A | 7/1999 | Parkyn, Jr. et al. |
| 6,045,240 A | 4/2000 | Hochstein |
| 6,274,924 B1 | 8/2001 | Carey et al. |
| 6,364,507 B1 | 4/2002 | Yang |
| 6,428,189 B1 | 8/2002 | Hochstein |
| 6,517,218 B2 | 2/2003 | Hochstein |
| 6,536,923 B1 | 3/2003 | Merz |
| 6,547,423 B2 | 4/2003 | Marshall et al. |
| 6,582,103 B1 | 6/2003 | Popovich |
| 6,607,286 B2 | 8/2003 | West et al. |
| 6,674,096 B2 | 1/2004 | Sommers |
| 6,741,351 B2 | 5/2004 | Marshall et al. |
| 6,783,269 B2 | 8/2004 | Pashley et al. |
| 6,784,603 B2 | 8/2004 | Pelka et al. |
| 6,799,864 B2 | 10/2004 | Bohler et al. |
| 6,837,605 B2 | 1/2005 | Reill |
| 6,864,513 B2 | 3/2005 | Lin et al. |
| 6,896,381 B2 | 5/2005 | Benitez et al. |
| 6,918,684 B2 | 7/2005 | Harvey |
| 6,948,838 B2 | 9/2005 | Kunstler |
| 7,006,306 B2 | 2/2006 | Falicoff et al. |
| 7,009,213 B2 | 3/2006 | Camras et al. |
| 7,048,400 B2 | 5/2006 | Murasko et al. |
| 7,118,236 B2 | 10/2006 | Hahm et al. |
| 7,144,135 B2 | 12/2006 | Martin et al. |
| 7,153,002 B2 | 12/2006 | Kim et al. |
| 7,159,997 B2 | 1/2007 | Reo et al. |
| 7,246,931 B2 | 7/2007 | Hsieh et al. |
| 7,336,195 B2 | 2/2008 | van de Ven |
| 7,339,202 B2 | 3/2008 | Chiu et al. |
| 7,374,306 B2 | 5/2008 | Liu |
| 7,374,316 B2 | 5/2008 | Kuo et al. |
| 7,375,381 B2 | 5/2008 | Shimizu et al. |
| 7,390,117 B2 | 6/2008 | Leatherdale et al. |
| 7,396,146 B2 | 7/2008 | Wang |
| 7,410,275 B2 | 8/2008 | Sommers et al. |
| 7,434,964 B1 | 10/2008 | Zheng et al. |
| 7,458,706 B1 | 12/2008 | Liu et al. |
| 7,478,915 B1 | 1/2009 | Pedersen |
| 7,513,639 B2 | 4/2009 | Wang |
| 7,513,653 B1 | 4/2009 | Liu et al. |
| 7,549,777 B2 | 6/2009 | Huang |
| 7,572,654 B2 | 8/2009 | Chang |
| 7,618,162 B1 | 11/2009 | Parkyn et al. |
| 7,618,163 B2 | 11/2009 | Wilcox |
| 7,648,257 B2 | 1/2010 | Villard |
| 7,654,684 B1 | 2/2010 | Wight et al. |
| 7,654,701 B2 | 2/2010 | Zhang et al. |
| 7,665,862 B2 | 2/2010 | Villard |
| 7,674,019 B2 | 3/2010 | Parkyn et al. |
| 7,686,469 B2 | 3/2010 | Ruud et al. |
| 7,722,224 B1 | 5/2010 | Coleman et al. |
| 7,736,019 B2 | 6/2010 | Shimada et al. |
| 7,748,863 B1 | 7/2010 | Holman et al. |
| 7,753,561 B2 | 7/2010 | Chaves et al. |
| 7,753,564 B2 | 7/2010 | Cheng et al. |
| 7,794,114 B2 | 9/2010 | Medendorp, Jr. |
| 7,824,070 B2 | 11/2010 | Higley et al. |
| 7,841,750 B2 | 11/2010 | Wilcox et al. |
| 7,857,483 B2 | 12/2010 | Storch et al. |
| 7,862,195 B2 | 1/2011 | Stack et al. |
| 7,866,851 B2 | 1/2011 | Chang |
| 7,896,522 B2 | 3/2011 | Heller et al. |
| 7,905,634 B2 | 3/2011 | Agurok et al. |
| 7,942,559 B2 | 5/2011 | Holder et al. |
| 7,952,262 B2 | 5/2011 | Wilcox et al. |
| 7,959,326 B2 | 6/2011 | Laporte |
| 7,980,733 B2 | 7/2011 | Shih et al. |
| 7,997,761 B2 | 8/2011 | Peck et al. |
| 8,002,435 B2 | 8/2011 | Laporte |
| 8,035,119 B2 | 10/2011 | Ng et al. |

(56) References Cited

U.S. PATENT DOCUMENTS

| | | |
|---|---|---|
| 8,052,303 B2 | 11/2011 | Lo et al. |
| 8,056,614 B2 | 11/2011 | Chen et al. |
| 8,061,869 B2 | 11/2011 | Lo |
| 8,092,049 B2 | 1/2012 | Kinnune et al. |
| 8,100,552 B2 | 1/2012 | Spero |
| 8,101,434 B2 | 1/2012 | Guillien et al. |
| 8,192,048 B2 | 6/2012 | Kristoffersen et al. |
| 8,201,970 B2 | 6/2012 | Wang et al. |
| 8,210,723 B2 | 7/2012 | Peck et al. |
| 8,215,814 B2 | 7/2012 | Marcoux |
| 8,235,546 B2 | 8/2012 | Takasago et al. |
| 8,235,553 B2 | 8/2012 | Minami et al. |
| 8,246,219 B2 | 8/2012 | Teng et al. |
| 8,256,919 B2 | 9/2012 | Holder et al. |
| 8,262,252 B2 | 9/2012 | Bergman et al. |
| 8,267,551 B2 | 9/2012 | Lin |
| 8,273,158 B2 | 9/2012 | Jarrier et al. |
| 8,308,331 B2 | 11/2012 | Loh |
| 8,310,158 B2 | 11/2012 | Coplin et al. |
| 8,330,387 B2 | 12/2012 | York et al. |
| 8,338,841 B2 | 12/2012 | Lerman et al. |
| 8,342,709 B2 | 1/2013 | Lueken et al. |
| 8,348,461 B2 | 1/2013 | Wilcox et al. |
| 8,360,613 B2 | 1/2013 | Little, Jr. |
| 8,376,585 B2 | 2/2013 | Noeth |
| 8,393,101 B2 | 3/2013 | Knight et al. |
| 8,408,737 B2 | 4/2013 | Wright et al. |
| 8,444,297 B2 | 5/2013 | Lee et al. |
| 8,454,194 B2 | 6/2013 | Liu |
| 8,454,215 B2 | 6/2013 | Bollmann |
| 8,465,178 B2 | 6/2013 | Wilcox et al. |
| 8,469,552 B2 | 6/2013 | Moeller |
| 8,476,650 B2 | 7/2013 | Liao |
| 8,529,085 B2 | 9/2013 | Josefowicz et al. |
| 8,545,049 B2 | 10/2013 | Davis et al. |
| 8,547,023 B2 | 10/2013 | Chang et al. |
| 8,567,987 B2 | 10/2013 | Wronski |
| 8,573,815 B2 | 11/2013 | Mallory et al. |
| 8,577,434 B2 | 11/2013 | Merchant et al. |
| 8,585,253 B2 | 11/2013 | Duong et al. |
| 8,602,599 B2 | 12/2013 | Zimmer et al. |
| 8,610,357 B2 | 12/2013 | Stoll et al. |
| 8,622,572 B2 | 1/2014 | Morgan |
| 8,622,574 B2 | 1/2014 | Liu |
| 8,628,217 B2 | 1/2014 | Moshtagh |
| 8,632,225 B2 | 1/2014 | Koo et al. |
| 8,635,049 B2 | 1/2014 | Kauffman et al. |
| 8,651,693 B2 | 2/2014 | Josefowicz et al. |
| 8,662,704 B2 | 3/2014 | Carraher et al. |
| 8,733,981 B2 | 5/2014 | Jiang et al. |
| 8,789,967 B2 | 7/2014 | Gordin et al. |
| 8,801,221 B2 | 8/2014 | Lin et al. |
| 8,814,396 B2 | 8/2014 | Ishida et al. |
| 8,824,125 B1 | 9/2014 | Cox et al. |
| 8,835,958 B2 | 9/2014 | Hsieh |
| 8,845,129 B1 | 9/2014 | Holder et al. |
| 8,858,024 B2 | 10/2014 | Wu et al. |
| 8,858,028 B2 | 10/2014 | Kim |
| 8,864,334 B2 | 10/2014 | Swafford, Jr. et al. |
| 8,864,344 B2 | 10/2014 | Jiang et al. |
| 8,870,410 B2 | 10/2014 | Auyeung |
| 8,870,413 B2 | 10/2014 | Auyeung |
| 8,876,325 B2 | 11/2014 | Lu et al. |
| 8,899,784 B2 | 12/2014 | Meyer |
| 8,911,160 B2 | 12/2014 | Seo et al. |
| 8,922,734 B2 | 12/2014 | Lin |
| 8,931,928 B2 | 1/2015 | Heintz |
| 8,931,934 B2 | 1/2015 | Lin |
| 8,950,921 B2 | 2/2015 | Sheng |
| 8,956,018 B2 | 2/2015 | Deshpande et al. |
| 9,028,097 B2 | 5/2015 | Wilcox |
| 9,046,293 B2 | 6/2015 | Pelka et al. |
| 9,182,101 B2 | 11/2015 | Nakamura et al. |
| 9,434,151 B2 | 9/2016 | Tanaka |
| 9,464,790 B2 | 10/2016 | Badley et al. |
| 9,523,491 B2 | 12/2016 | Bailey et al. |
| 9,651,218 B2 | 5/2017 | Gattari |
| 9,699,854 B2 | 7/2017 | Wassel |
| 9,739,482 B2 | 8/2017 | Georgitsis et al. |
| 9,752,749 B2 | 9/2017 | Adams |
| 9,791,116 B2 | 10/2017 | Mrakovich et al. |
| 9,822,952 B2 | 11/2017 | Farmer et al. |
| 9,857,051 B2 | 1/2018 | Ikeda et al. |
| 10,012,375 B1 | 7/2018 | Salessi |
| 2003/0099105 A1 | 5/2003 | Watson |
| 2004/0004827 A1 | 1/2004 | Guest |
| 2005/0018428 A1 | 1/2005 | Harvey |
| 2005/0047170 A1 | 3/2005 | Hilburger et al. |
| 2005/0151141 A1 | 7/2005 | Grotsch et al. |
| 2005/0128752 A1 | 8/2005 | Ewington et al. |
| 2006/0076568 A1 | 4/2006 | Keller et al. |
| 2006/0081863 A1 | 4/2006 | Kim et al. |
| 2006/0146531 A1 | 7/2006 | Reo et al. |
| 2006/0245083 A1 | 11/2006 | Chou et al. |
| 2007/0201225 A1 | 8/2007 | Holder |
| 2007/0257270 A1 | 11/2007 | Lu et al. |
| 2007/0279904 A1 | 12/2007 | Tasch et al. |
| 2008/0073663 A1 | 3/2008 | Chang |
| 2008/0080179 A1 | 4/2008 | Giorgi |
| 2008/0084693 A1 | 4/2008 | Shimada et al. |
| 2008/0084701 A1 | 4/2008 | Van De Ven et al. |
| 2008/0180014 A1 | 7/2008 | Tzeng et al. |
| 2008/0212319 A1 | 9/2008 | Klipstein |
| 2008/0247173 A1 | 10/2008 | Danek et al. |
| 2008/0273327 A1 | 11/2008 | Wilcox et al. |
| 2009/0097265 A1 | 4/2009 | Sun et al. |
| 2009/0154158 A1 | 6/2009 | Cheng et al. |
| 2009/0180281 A1 | 7/2009 | Ahland, III et al. |
| 2009/0256459 A1 | 10/2009 | Liu |
| 2009/0262532 A1 | 10/2009 | Wilcox et al. |
| 2009/0267474 A1 | 10/2009 | Zhou et al. |
| 2009/0273933 A1 | 11/2009 | Woodward et al. |
| 2009/0290338 A1 | 11/2009 | Heller et al. |
| 2009/0296407 A1 | 12/2009 | Bailey |
| 2009/0303711 A1 | 12/2009 | Remus et al. |
| 2010/0008094 A1 | 1/2010 | Shuai et al. |
| 2010/0014289 A1 | 1/2010 | Thomas et al. |
| 2010/0014290 A1 | 1/2010 | Wilcox |
| 2010/0002727 A1 | 2/2010 | Wilcox et al. |
| 2010/0027271 A1 | 2/2010 | Wilcox et al. |
| 2010/0039810 A1 | 2/2010 | Holder et al. |
| 2010/0046225 A1 | 2/2010 | Zheng |
| 2010/0085774 A1 | 4/2010 | Park |
| 2010/0118531 A1 | 5/2010 | Montagne |
| 2010/0128488 A1 | 5/2010 | Marcoux |
| 2010/0148673 A1 | 6/2010 | Stewart et al. |
| 2010/0149801 A1 | 6/2010 | Lo et al. |
| 2010/0172135 A1 | 7/2010 | Holder et al. |
| 2010/0195330 A1 | 8/2010 | Schaefer et al. |
| 2010/0232155 A1 | 9/2010 | Wang |
| 2010/0296267 A1 | 11/2010 | Yu et al. |
| 2010/0296283 A1 | 11/2010 | Taskar et al. |
| 2010/0302785 A1 | 12/2010 | Zhou |
| 2010/0302786 A1 | 12/2010 | Wilcox et al. |
| 2011/0002120 A1 | 1/2011 | Song et al. |
| 2011/0031887 A1 | 2/2011 | Stoll et al. |
| 2011/0038151 A1 | 2/2011 | Carraher et al. |
| 2011/0063857 A1 | 3/2011 | Li et al. |
| 2011/0068708 A1 | 3/2011 | Coplin et al. |
| 2011/0075409 A1 | 3/2011 | Zheng |
| 2011/0149548 A1 | 6/2011 | Yang et al. |
| 2011/0170283 A1 | 7/2011 | Chan |
| 2011/0205744 A1 | 8/2011 | Kim |
| 2011/0219650 A1 | 9/2011 | Wright et al. |
| 2011/0242807 A1 | 10/2011 | Little, Jr. et al. |
| 2011/0242816 A1 | 10/2011 | Chowdhury et al. |
| 2011/0278633 A1 | 11/2011 | Clifford |
| 2011/0280003 A1 | 11/2011 | Hsu et al. |
| 2012/0014115 A1 | 1/2012 | Park et al. |
| 2012/0043560 A1 | 2/2012 | Wu et al. |
| 2012/0080699 A1 | 4/2012 | Chowdhury et al. |
| 2012/0087125 A1 | 4/2012 | Liu |
| 2012/0163005 A1 | 6/2012 | Liu |
| 2012/0192486 A1 | 8/2012 | Shanahan et al. |

(56) References Cited

U.S. PATENT DOCUMENTS

| | | | |
|---|---|---|---|
| 2012/0201022 A1 | 8/2012 | van de Ven et al. |
| 2012/0250321 A1 | 10/2012 | Blincoe et al. |
| 2012/0307495 A1 | 12/2012 | Shih |
| 2013/0010468 A1 | 1/2013 | Stoll et al. |
| 2013/0057861 A1 | 3/2013 | Ishii et al. |
| 2013/0063970 A1 | 3/2013 | Oh |
| 2013/0120991 A1 | 5/2013 | Wohlgemuth et al. |
| 2013/0135861 A1 | 5/2013 | Chen et al. |
| 2013/0163005 A1 | 6/2013 | Tsang |
| 2013/0193850 A1 | 8/2013 | Demuynck et al. |
| 2013/0270585 A1 | 10/2013 | Mei et al. |
| 2013/0291414 A1 | 11/2013 | Cegnar |
| 2013/0335979 A1 | 12/2013 | Lauret et al. |
| 2014/0016326 A1 | 1/2014 | Dieker et al. |
| 2014/0029253 A1 | 1/2014 | Auyeung |
| 2014/0029259 A1 | 1/2014 | Auyeung |
| 2014/0029274 A1 | 1/2014 | Auyeung |
| 2014/0085905 A1 | 3/2014 | Broughton |
| 2014/0104851 A1 | 4/2014 | Auyeung |
| 2014/0112007 A1 | 4/2014 | Auyeung |
| 2014/0168963 A1 | 6/2014 | Stone et al. |
| 2014/0168998 A1 | 6/2014 | Tang et al. |
| 2014/0268761 A1 | 9/2014 | Raleigh et al. |
| 2014/0293619 A1 | 10/2014 | Feng et al. |
| 2014/0373348 A1 | 12/2014 | Li |
| 2017/0321869 A1 | 11/2017 | Bryant |

FOREIGN PATENT DOCUMENTS

| | | |
|---|---|---|
| CN | 201973564 U | 9/2011 |
| CN | 202629916 U | 12/2012 |
| CN | 102889549 A | 1/2013 |
| DE | 202005016441 U1 | 2/2007 |
| EP | 1078301 A1 | 2/2001 |
| EP | 1528603 A2 | 5/2005 |
| EP | 1988576 A1 | 11/2008 |
| EP | 2039985 A2 | 3/2009 |
| EP | 2092859 A1 | 8/2009 |
| EP | 2172696 A1 | 4/2010 |
| EP | 2378337 A2 | 10/2011 |
| EP | 2416062 A2 | 2/2012 |
| EP | 2448021 A2 | 5/2012 |
| EP | 2553331 A1 | 2/2013 |
| EP | 2622267 A1 | 8/2013 |
| GB | 2421584 A | 6/2006 |
| JP | 2003195790 A | 7/2003 |
| JP | 2004281352 A | 10/2004 |
| JP | 2005024706 A | 1/2005 |
| JP | 2005217094 A | 8/2005 |
| JP | 2005327820 A | 11/2005 |
| JP | 2007035951 A | 2/2007 |
| JP | 2007281260 A | 10/2007 |
| JP | 2011060575 A | 3/2011 |
| JP | 2012054115 A | 3/2012 |
| JP | 2012113276 A | 6/2012 |
| KR | 20080101832 A | 11/2008 |
| KR | 101053785 B1 | 8/2011 |
| WO | 2004051223 A2 | 6/2004 |
| WO | 2006033770 A2 | 3/2006 |
| WO | 2006126123 A1 | 11/2006 |
| WO | 2008047335 A1 | 4/2008 |
| WO | 2008122941 A1 | 10/2008 |
| WO | 2009064607 A1 | 5/2009 |
| WO | 2010010494 A1 | 1/2010 |
| WO | 2010033545 A2 | 3/2010 |
| WO | 2010130732 A1 | 11/2010 |
| WO | 2011041813 A1 | 4/2011 |
| WO | 2011042837 A1 | 4/2011 |
| WO | 2011123267 A1 | 10/2011 |
| WO | 2012021718 A1 | 2/2012 |
| WO | 2012095242 A1 | 7/2012 |
| WO | 2012121718 A1 | 9/2012 |

OTHER PUBLICATIONS

Tracepro, "LED Reflector and Lens Simulation Usingt TracePro Illumination Design and Analysis Software," White Paper, Oct. 2013, 11 pages.
Tsai, J. et al., "LED Backlight Module by a Lightguide-Diffusive Component With Tetrahedron Reflector Array," J. Display Tech., vol. 8, No. 6, Jun. 2012, pp. 321-328.
Hubbell Lighting, "Universal Lighting Technologies Invention Disclosure," Jun. 14, 2012, 15 pages.
P.R. 4-3 Joint Claim Construction and Prehearing Statement, *Ultravision Technologies v. Lamar et al.*, E.D. Texas, Case No. 2:16-cv-374, filed Jan. 27, 2017, pp. 1-20.
Wang, K et al., "Freeform LED Lens for Rectangularly Prescribed Illumination," J. Opt. A: Pure Appl. Opt., No. 11, Aug. 2009, 105501, 10 pages.
Wang, K et al., "New reversing design method for LED uniform illumination," Optics Express, vol. 19, Issue S4, Jul. 4, 2011, pp. A830-A840.
West, R.S. et al., "43.4: High Brightness Direct LED Backlight for LCD-TV," SID 03 Digest, May 2003, 4 pages.
Wu, D. et al., "Freeform Lens Design for Uniform Illumination with Extended Source," 2011 In▼ I Conf. Elecs. Packaging Tech. & High Density Packaging, Aug. 2011, pp. 1085-1089.
Wu, R. et al., "Optimization Design of Irradiance Array for LED Uniform Rectangular Illumination," Applied Optics, vol. 1, No. 13, May 2012, pp. 2257-2263.
Zhenrong, Z. et al., "Freeform Surface Lens for LED Uniform Illumination," Applied Optics, vol. 48, No. 35, Dec. 2009, pp. 6627-6634.
Zhu, Z. et al., "Uniform Illumination Design by Configuration of LED Array and Diffuse Reflection Surface for Color Vision Application," J. Display tech, vol. 7, No. 2, Feb. 2011, pp. 84-89.
Lee, S., "How to Select a Heat Sink," http:www.electronics-cooling.com/1995/06/how-to-select-a-heat-sink/, Jun. 1, 1995, pp. 1-10.
Huang, K. et al., "Free-form lens design for LED indoor illumination," Proc. of SPIE, vol. 7852, Nov. 15, 2010, pp. 78521 D-1-78521 D-8.
"The Lighting Handbook," 12-18, IES 10th Edition, Dec. 6, 2011, 1 page.
"The Lighting Handbook," 8-17, IES 10th Edition, Dec. 6, 2011, 2 pages.
Steigerwald, et al., "Illumination with Solid State Lighting Technology," IEEE Journal on Selected Topics in Quantum Electronics, vol. 8, No. 2, Mar./Apr. 2002, pp. 310-320.
Defendant Irvin International, Inc.'s Answer, Affirmative Defenses, and Counterclaims to Plaintiff's Complaint, *Ultravision Technologies v. Lamar et al.*, E.D. Texas, Case No. 2:16-cv-374, filed Jun. 6, 2016, pp. 1-41.
Jeon, H. et al., Illuminance Distribution and Photosynthetic Photon Flux Density Characteristics of LED Lighting with Periodic Lattice Arrangements, Transactions on Electrical and Electronic Materials, vol. 13, No. 1, Feb. 25, 2012, pp. 16-18.
Jiang, J., "Optical design of a freeform TIR lens for LED streetlight," Optik—International Journal for Light and Electron Optics, vol. 121, Issue 19, Oct. 2010, pp. 1761-1765.
Defendants Corrected Joint Invalidity Contentions, *Ultravision Technologies v. Lamar et al.*, E.D. Texas, Case No. 2:16-cv-374, Sep. 9, 2016, pp. 1-108.
Keller, A., "Signs of the Times," Floridatrend.com, Dec. 2011, pp. 50-53.
Kim, Yu-Sin, et al., "Development of a Numerical Model for the Luminous Intensity Distribution of a Planar Prism LED Luminaire for Applying an Optimization Algorithm," Luekos, vol. 9, No. 1, Jul. 2012, pp. 57-72.
Lakkio, O., "Winning the Optical Challenges in LED Street Lighting," Digi-Key, May 27, 2011, 5 pages.
Lama☐ s First Amended Answer and Counterclaims to PlaintifX̸ s Complaint, *Ultravision Technologies v. Lamar et al.*, E.D. Texas, Case No. 2:16-cv-374, filed Jun. 8, 2016, pp. 1-61.
"Billie—The Bright Answer for Billboard Lighting," Ledil Product Release, Dec. 8, 2013, 2 pages.
"Ledil Standard Optics for Osram LEDs," Ledil, Jan. 2011, 60 pages.

(56) References Cited

OTHER PUBLICATIONS

"Strada 6in1 Module for Streeting Lighting," Ledil, 2010, 1 page, <<http://ledil.fi/sites/default/files/Documents/Technical/Articles/Article_2.pdf>>.
LEDIL, "Who is LEDIL?," www.ledil.com, Mar. 22, 2011, 17 pages.
LEDIL, "Who is LEDIL?," www.ledil.com, May 22, 2011, 68 pages.
Lee, S. et al., "Driving Performance and Digital Billboards Final Report," Virginia Tech Transportation Institute, Center for Automotive Safety Research, Mar. 22, 2007, 90 pages.
Lee, Hsiao-Wen, et al., "Improvement of Illumination Uniformity for LED Flat Panel Light by Using Micro-Secondary Lens Array," Optics Express, vol. 20, No. S6, Nov. 5, 2012, 11 pages.
Lighting Solutions Techzone Magazine, "Look Inside Today's Lighting Technology," Digi-Key Corporation, TZL112.US, Jun. 7, 2011, 76 pages.
Liu, Peng, et al., "Optimized Design of LED Freeform Lens for Uniform Circular Illumination," Journal of Zhejiang University—Science C (Computers & Electronics), 2012, pp. 929-936.
Lo, Y. et al., "Optical Design of a Butterfly Lens for a Street Light Based on a Double-Cluster LED," Microelectronics Reliability, vol. 52, May 2011, pp. 889-893.
LED Professional Review, Issue 17, Jan./Feb. 2010, 52 pages.
LED Professional Review, Issue 18, Mar./Apr. 2010, 64 pages.
LED Professional Review, Issue 19, May/Jun. 2010, 64 pages.
LED Professional Review, Issue 20, Jul./Aug. 2010, 48 pages.
LED Professional Review, Issue 21, Sep./Oct. 2010, 64 pages.
LED Professional Review, Issue 22, Nov./Dec. 2010, 60 pages.
Defendant American Lighting Technologies, Inc. D/B/A Lighting Technologie▲ Amended Answer, Affirmative Defenses and Counterclaims to Plaintif✗· s Complaint, *Ultravision Technologies v. Lamar et al.*, E.D. Texas, Case No. 2:16-cv-374, filed Jun. 27, 2016, pp. 1-43.
Defendant American Lighting Technologies, Inc. D/B/A Lighting Technologies' Answer and Affirmative Defenses to Plaintiff's Complaint, *Ultravision Technologies v. Lamar et al.*, E.D. Texas, Case No. 2:16-cv-374, filed Jun. 6, 2016, pp. 1-37.
Luminautics, "LED Display Primer," 2011, pp. 1-21.
Luo, X. et al., "Automated Optimization of an Aspheric Light-Emitting Diode Lens for Uniform Illumination," Applied Optics, vol. 50, No. 20, Jul. 2011, pp. 3412-3418.
Moreno, I., "Configuration of LED Arrays for Uniform Illumination," Proc. of SPIE, vol. 5622, Oct. 2004, pp. 713-718.
"LED Ad-Poster Billboard Luminaire," Neptun, Jan. 2012, 1 page.
"LED Ad-Poster Billboard Luminaire," Neptun, May 25, 2011, 1 page.
Selected portions of U.S. Appl. No. 14/630,500, filed Feb. 24, 2015 (now U.S. Pat. No. 9,812,043, issued Nov. 7, 2017), 236 pages.
"Street Lighting with LED Lights Sources Application Note," OSRAM Opto Semiconductors, Jan. 2009, pp. 1-10.
Parkyn, William A., "Segmented Illumination Lenses for Steplighting and Wall-Washing," SPIE Conference on Current Development in Optical Design and Optical Engineering VIII, Denver, Colorado, Jul. 1999, SPIE vol. 3779, pp. 363-370.
Qin, Z. et al., "Analysis of Condition for Uniform Lighting Generated by Array of Light Emitting Diodes with Large View Angle," Optics Express, vol. 18, No. 16, Aug. 2010, pp. 17460-17476.
Ramane, D. et al., "Automated Test Jig for Uniformity Evaluation of Luminaries," IJAET, vol. 3, No. 1, Mar. 2012, pp. 41-47.
"Starbeam," Thorlux Lighting, Brochure, Aug. 2012, 8 pages.
"Starbeam," Thorlux Lighting, Brochure, Jul. 2015, 4 pages.
"Starbeam," Thorlux Lighting, Brochure, Mar. 2014, 16 pages.
"Starbeam," Thorlux Lighting, Technical Information, Mar. 2014, 10 pages.
"Starflood," Thorlux Lighting, Brochure, Mar. 2016, 16 pages.
"Starflood; High performance mini LED floodlights," Thorlux Lighting, Retrieved Jul. 21, 2016, 16 pages, <<http://www.thorlux.com/luminaires/starflood>>.
Cheng, et al., "The Research of LED Arrays for Uniform Illumination," Advances in Information Sciences and Service Sciences (AISS), vol. 4, No. 10, Jun. 2012, pp. 174-182.
Arik, M., "Thermal Management of LEDs: Package to System," Third International Conference on Solid State Lighting, Proc. of SPIE, vol. 5187, Jan. 21, 2012, pp. 64-75.
"LED Billboard Light 40W", LeKlse, Mar. 21, 2011.
"Ad-Poster I LED Billboard Fixture Description", Neptun Light, Inc., May 14, 2012, https://web.archive.org/web/20120514123442/http://www.neptunlight.com/productdetails/64/186/adposter-i-led-billboard-fixture.html.
Adaptive Micro Systems, LLC, "Signs—Sealed and Delivered! Adaptive's Approach to Heat Management," Mar. 2008, 2 pages.
"Advanced Lighting Guidelines," 2001 Edition, New Buildings Institute, Inc., Jul. 20, 2001, 394 pages.
Dieker, et al., U.S. Appl. No. 61/659,828, filed Jun. 14, 2012, "Asymmetric Area Lighting Lens with Improved Uniformity," 14 pages.
Barco, "DB-x20 Digital Billboard Out-of-Home Media LED Screen," Apr. 2009, 6 pages.
Batinsey, J., "Outdoor Lighting Ordinance Guide," Jun. 2006, 17 pages.
Chang, R. et al., "LED Backlight Module by Lightguide-Diffusive Component," Journal of Display Technology, vol. 8, No. 2, Feb. 2012, pp. 79-86.
Chen, C. et al., "P-72: Inclined LED Array for Large-Sized Backlight System," Society for Information Display, International Symposium, Digest of Technical Papers, SID 05 Digest, May 2005, pp. 558-561.
"Unified Development Code," Chapter 10 of the Tyler Code of Ordinances, City of Tyler, Apr. 23, 2008, 378 pages.
Defendants Invalidity Contentions, Appendix A, *Ultravision Technologies v. Lamar et al.*, E.D. Texas, Case No. 2:16-cv-374, Sep. 9, 2016, pp. 1-19.
Defendants Invalidity Contentions, ExhibitA01, *Ultravision Technologies v. Lamar et al.*, E.D. Texas, Case No. 2:16-cv-374, Sep. 9, 2016, pp. 1-80.
Defendants Invalidity Contentions, ExhibitA02, *Ultravision Technologies v. Lamar et al.*, E.D. Texas, Case No. 2:16-cv-374, Sep. 9, 2016, pp. 1-74.
Defendants Invalidity Contentions, ExhibitA03, *Ultravision Technologies v. Lamar et al.*, E.D. Texas, Case No. 2:16-cv-374, Sep. 9, 2016, pp. 1-52.
Defendants Invalidity Contentions, ExhibitA04, *Ultravision Technologies v. Lamar et al.*, E.D. Texas, Case No. 2:16-cv-374, Sep. 9, 2016, pp. 1-53.
Defendants Invalidity Contentions, ExhibitB01, *Ultravision Technologies v. Lamar et al.*, E.D. Texas, Case No. 2:16-cv-374, Sep. 9, 2016, pp. 1-34.
Defendants Invalidity Contentions, ExhibitB02, *Ultravision Technologies v. Lamar et al.*, E.D. Texas, Case No. 2:16-cv-374, Sep. 9, 2016, pp. 1-36.
Defendants Invalidity Contentions, ExhibitB03, *Ultravision Technologies v. Lamar et al.*, E.D. Texas, Case No. 2:16-cv-374, Sep. 9, 2016, pp. 1-21.
Defendants Invalidity Contentions, ExhibitB04, *Ultravision Technologies v. Lamar et al.*, E.D. Texas, Case No. 2:16-cv-374, Sep. 9, 2016, pp. 1-27.
Defendants Invalidity Contentions, ExhibitC01, *Ultravision Technologies v. Lamar et al.*, E.D. Texas, Case No. 2:16-cv-374, Sep. 9, 2016, pp. 1-52.
Defendants Invalidity Contentions, ExhibitC02, *Ultravision Technologies v. Lamar et al.*, E.D. Texas, Case No. 2:16-cv-374, Sep. 9, 2016, pp. 1-67.
Defendants Invalidity Contentions, ExhibitC03, *Ultravision Technologies v. Lamar et al.*, E.D. Texas, Case No. 2:16-cv-374, Sep. 9, 2016, pp. 1-35.
Defendants Invalidity Contentions, ExhibitC04, *Ultravision Technologies v. Lamar et al.*, E.D. Texas, Case No. 2:16-cv-374, Sep. 9, 2016, pp. 1-87.
Defendants Invalidity Contentions, ExhibitC05, *Ultravision Technologies v. Lamar et al.*, E.D. Texas, Case No. 2:16-cv-374, Sep. 9, 2016, pp. 1-51.

(56) References Cited

OTHER PUBLICATIONS

Defendants Invalidity Contentions, ExhibitC06, *Ultravision Technologies* v. *Lamar et al.*, E.D. Texas, Case No. 2:16-cv-374, Sep. 9, 2016, pp. 1-79.
Defendants Invalidity Contentions, ExhibitD01, *Ultravision Technologies* v. *Lamar et al.*, E.D. Texas, Case No. 2:16-cv-374, Sep. 9, 2016, pp. 1-109.
Defendants Invalidity Contentions, ExhibitD02, *Ultravision Technologies* v. *Lamar et al.*, E.D. Texas, Case No. 2:16-cv-374, Sep. 9, 2016, pp. 1-186.
Defendants Invalidity Contentions, ExhibitD03, *Ultravision Technologies* v. *Lamar et al.*, E.D. Texas, Case No. 2:16-cv-374, Sep. 9, 2016, pp. 1-133.
Defendants Invalidity Contentions, ExhibitD04, *Ultravision Technologies* v. *Lamar et al.*, E.D. Texas, Case No. 2:16-cv-374, Sep. 9, 2016, pp. 1-111.
Defendants Invalidity Contentions, ExhibitD05, *Ultravision Technologies* v. *Lamar et al.*, E.D. Texas, Case No. 2:16-cv-374, Sep. 9, 2016, pp. 1-133.
Defendants Invalidity Contentions, ExhibitD06, *Ultravision Technologies* v. *Lamar et al.*, E.D. Texas, Case No. 2:16-cv-374, Sep. 9, 2016, pp. 1-135.
Defendants Invalidity Contentions, ExhibitE01, *Ultravision Technologies* v. *Lamar et al.*, E.D. Texas, Case No. 2:16-cv-374, Sep. 9, 2016, pp. 1-169.
Defendants Invalidity Contentions, ExhibitE02, *Ultravision Technologies* v. *Lamar et al.*, E.D. Texas, Case No. 2:16-cv-374, Sep. 9, 2016, pp. 1-192.
Defendants Invalidity Contentions, ExhibitE03, *Ultravision Technologies* v. *Lamar et al.*, E.D. Texas, Case No. 2:16-cv-374, Sep. 9, 2016, pp. 1-443.
Defendants Invalidity Contentions, ExhibitE04, *Ultravision Technologies* v. *Lamar et al.*, E.D. Texas, Case No. 2:16-cv-374, Sep. 9, 2016, pp. 1-171.
Defendants Invalidity Contentions, ExhibitF01, *Ultravision Technologies* v. *Lamar et al.*, E.D. Texas, Case No. 2:16-cv-374, Sep. 9, 2016, pp. 1-34.
Defendants Invalidity Contentions, ExhibitF02, *Ultravision Technologies* v. *Lamar et al.*, E.D. Texas, Case No. 2:16-cv-374, Sep. 9, 2016, pp. 1-13.
Defendants Invalidity Contentions, ExhibitF03, *Ultravision Technologies* v. *Lamar et al.*, E.D. Texas, Case No. 2:16-cv-374, Sep. 9, 2016, pp. 1-100.
Defendants Invalidity Contentions, ExhibitG01, *Ultravision Technologies* v. *Lamar et al.*, E.D. Texas, Case No. 2:16-cv-374, Sep. 9, 2016, pp. 1-30.
Defendants Invalidity Contentions, ExhibitG02, *Ultravision Technologies* v. *Lamar et al.*, E.D. Texas, Case No. 2:16-cv-374, Sep. 9, 2016, pp. 1-11.
Defendants Invalidity Contentions, ExhibitG03, *Ultravision Technologies* v. *Lamar et al.*, E.D. Texas, Case No. 2:16-cv-374, Sep. 9, 2016, pp. 1-94.
Defendants Invalidity Contentions, ExhibitH01 (redacted), *Ultravision Technologies* v. *Lamar et al.*, E.D. Texas, Case No. 2:16-cv-374, Sep. 9, 2016, pp. 1-60.
Defendants Invalidity Contentions, ExhibitH02 (redacted), *Ultravision Technologies* v. *Lamar et al.*, E.D. Texas, Case No. 2:16-cv-374, Sep. 9, 2016, pp. 1-26.
Defendants Invalidity Contentions, ExhibitH03 (redacted), *Ultravision Technologies* v. *Lamar et al.*, E.D. Texas, Case No. 2:16-cv-374, Sep. 9, 2016, pp. 1-71.
Defendants Invalidity Contentions, ExhibitH04 (redacted), *Ultravision Technologies* v. *Lamar et al.*, E.D. Texas, Case No. 2:16-cv-374, Sep. 9, 2016, pp. 1-151.
Defendants Invalidity Contentions, ExhibitH05 (redacted), *Ultravision Technologies* v. *Lamar et al.*, E.D. Texas, Case No. 2:16-cv-374, Sep. 9, 2016, pp. 1-181.
Defendants Invalidity Contentions, ExhibitI01 (redacted), *Ultravision Technologies* v. *Lamar et al.*, E.D. Texas, Case No. 2:16-cv-374, Sep. 9, 2016, pp. 1-168.
Deepa, R. et al., "Modeling and Simulation of Multielement LED Source," The Illuminating Engineering Institute of Japan, Journal of Light & Visual Environment, vol. 35, No. 1, Jun. 21, 2011, pp. 34-41.
Deepa, R. et al., Optimization of multip-element LED source for uniform illumination of plane surface, Optical Society of America, Optics Express, vol. 19, No. S4, Jul. 4, 2011, pp. A639-A648.
Design & Engineering Services, "Advanced Lighting Systems for Externally Lit Billboards," ET 08.12 Report, Southern California Edison, Jan. 4, 2010, 58 pages.
Whang, et al., "Designing Uniform Illumination Systems by Surface-Tailored Lens and Configurations of LED Arrays," IEEE 2009, Journal of Display Technology, vol. 5, No. 3, Mar. 2009, pp. 94-103.
Ding, Y., "Freeform LED lens for uniform illumination," Optics Express, vol. 16, No. 17, Aug. 18, 2008, 9 pages.

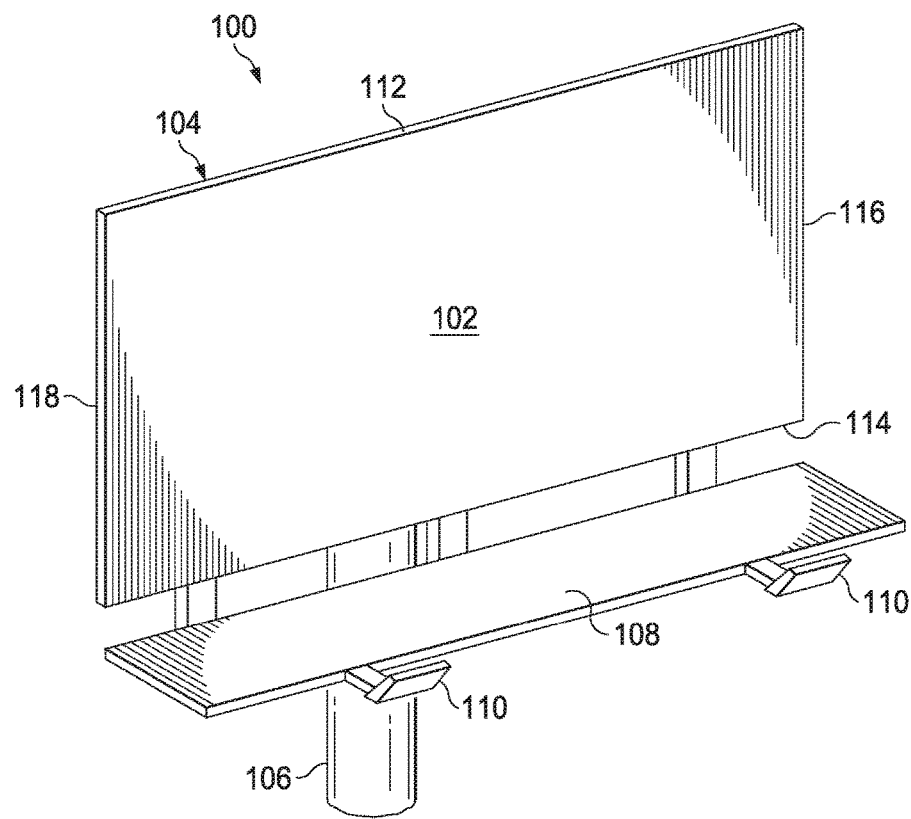
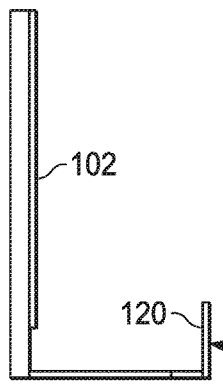 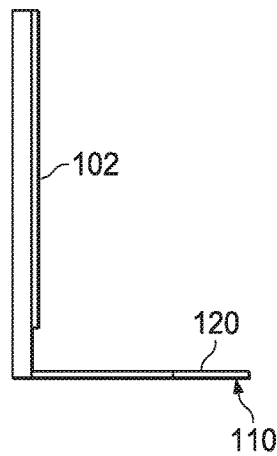 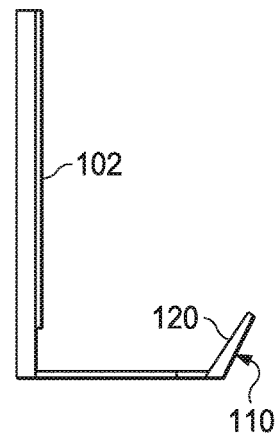
FIG. 1A
FIG. 1B  FIG. 1C  FIG. 1D

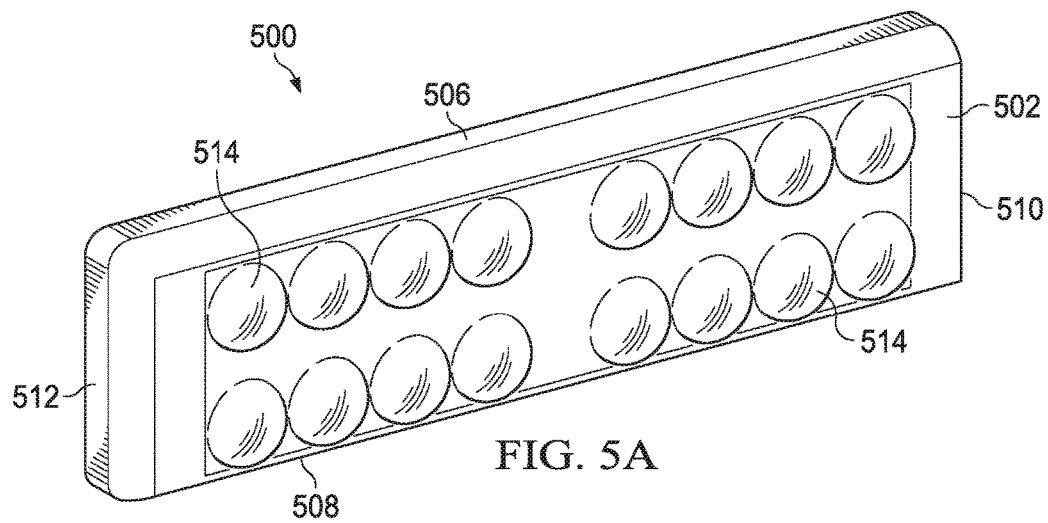
FIG. 5A
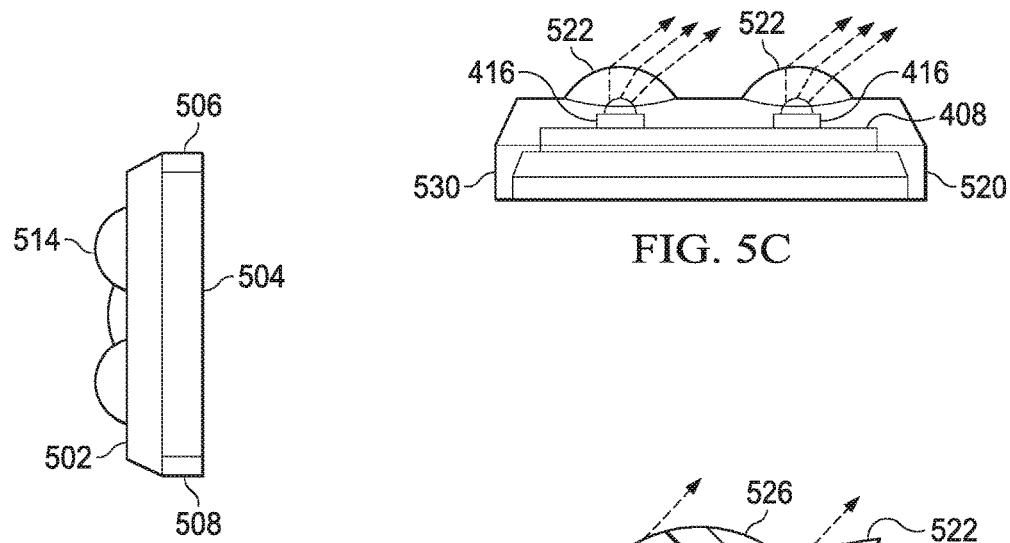
FIG. 5B
FIG. 5C
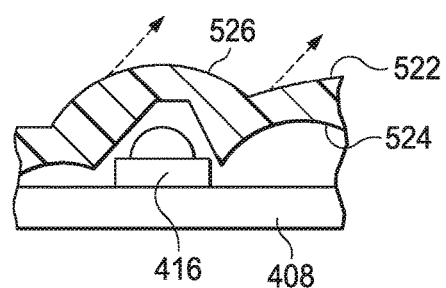
FIG. 5D

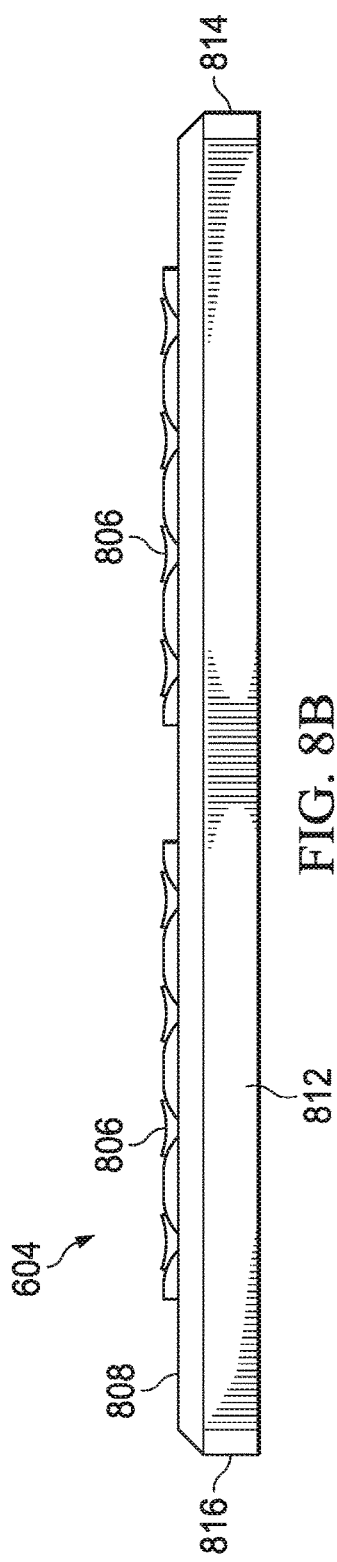
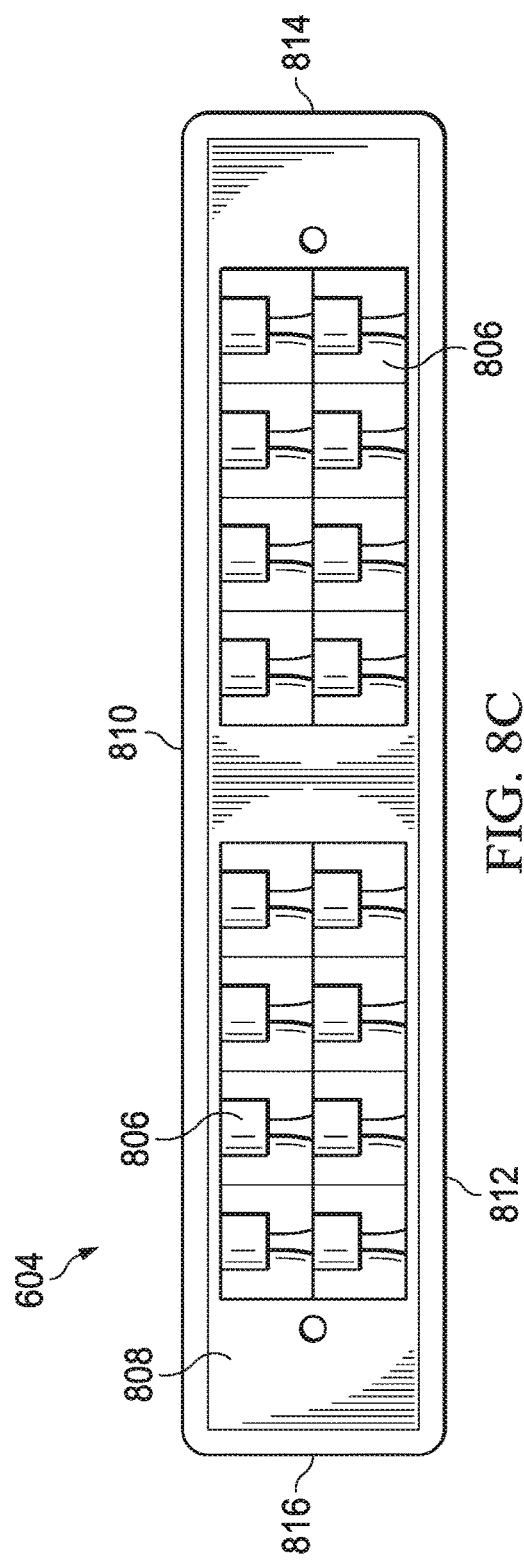

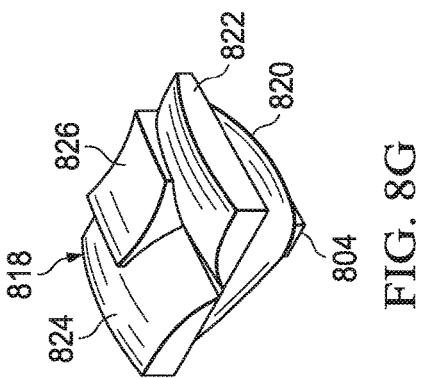
FIG. 8G
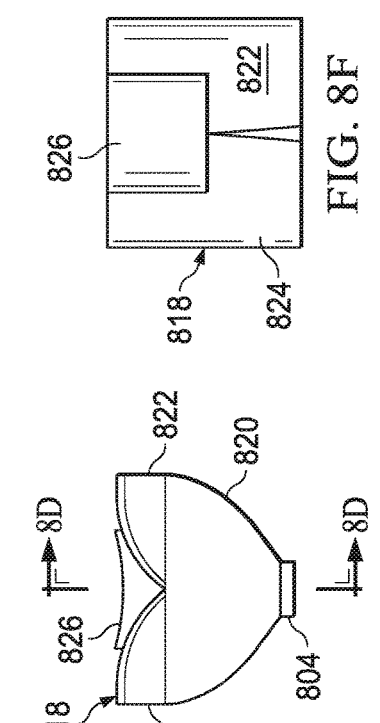
FIG. 8F
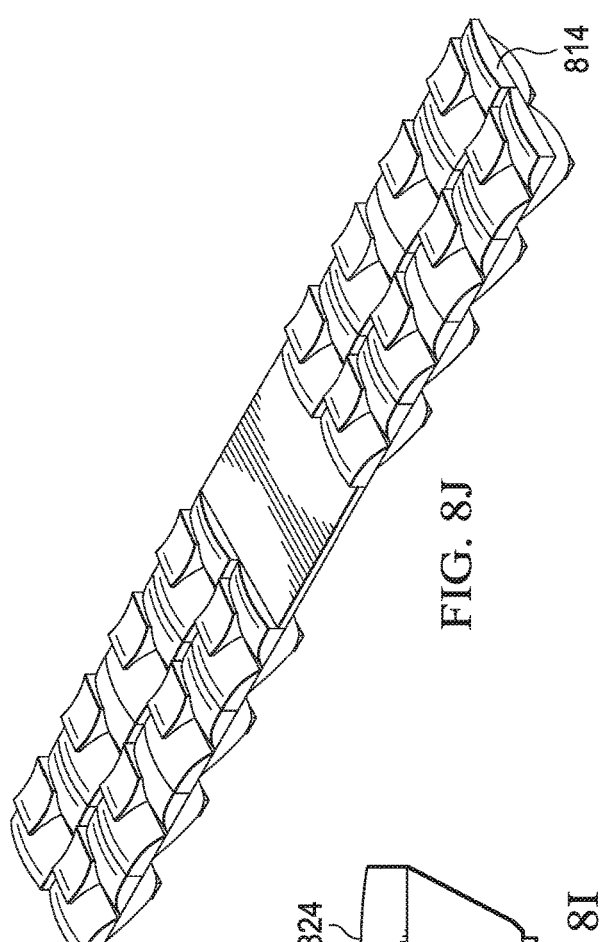
FIG. 8J
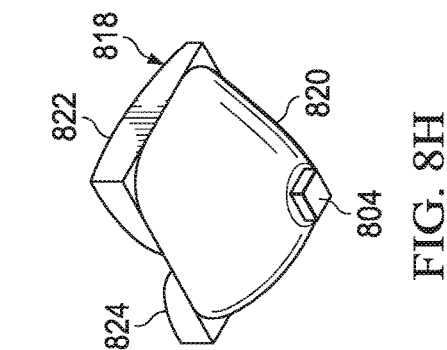
FIG. 8I
FIG. 8E
FIG. 8H
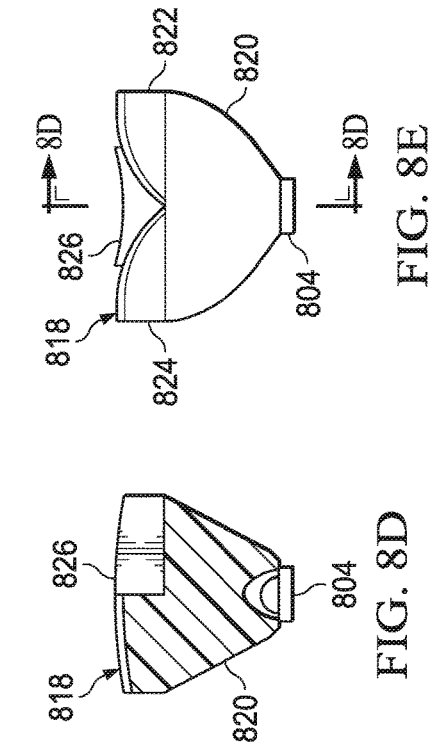
FIG. 8D

LIGHTING ASSEMBLY WITH MULTIPLE LIGHTING UNITS

CROSS-REFERENCE TO RELATED APPLICATIONS

This is a continuation of U.S. patent application Ser. No. 15/676,823, filed Aug. 14, 2017, which is a continuation of U.S. patent application Ser. No. 15/162,278, filed May 23, 2016, which is a continuation of U.S. patent application Ser. No. 14/992,680, filed Jan. 11, 2016, which is a continuation of U.S. patent application Ser. No. 14/635,907, filed Mar. 2, 2015, which is a continuation of U.S. patent application Ser. No. 13/836,517, filed Mar. 15, 2013, which claims the benefit of U.S. Provisional Application No. 61/677,346, filed on Jul. 30, 2012, which applications are hereby incorporated herein by reference.

The following patents and applications are related:

U.S. Pat. Appl. No. 61/677,340, filed Jul. 20, 2012
U.S. Pat. Appl. No. 61/677,346, filed Jul. 30, 2012
U.S. Pat. Appl. No. 61/677,352, filed Jul. 30, 2012
U.S. patent application Ser. No. 13/836,517, filed Mar. 15, 2013 (now U.S. Pat. No. 8,974,077)
U.S. patent application Ser. No. 13/836,612, filed Mar. 15, 2013 (now U.S. Pat. No. 8,870,410)
U.S. patent application Ser. No. 13/836,710, filed Mar. 15, 2013 (now U.S. Pat. No. 9,062,873)
U.S. patent application Ser. No. 14/137,306, filed Dec. 30, 2013 (now U.S. Pat. No. 8,985,806)
U.S. patent application Ser. No. 14/137,343, filed Dec. 20, 2013 (now U.S. Pat. No. 8,870,413)
U.S. patent application Ser. No. 14/137,380, filed Dec. 20, 2013 (now U.S. Pat. No. 9,068,738)
U.S. patent application Ser. No. 14/630,500, filed Feb. 24, 2015 (now U.S. Pat. No. 9,812,043))
U.S. patent application Ser. No. 14/635,907, filed Mar. 2, 2015 (now U.S. Pat. No. 9,234,642)
U.S. patent application Ser. No. 14/706,634, filed May 7, 2015 (now U.S. Pat. No. 9,212,803)
U.S. patent application Ser. No. 14/968,520, filed Dec. 14, 2015 (now U.S. Pat. No. 9,589,488)
U.S. patent application Ser. No. 14/992,680, filed Jan. 11, 2016 (now U.S. Pat. No. 9,349,307)
U.S. patent application Ser. No. 15/162,278, filed May 23, 2016 (now U.S. Pat. No. 9,734,737)
U.S. patent application Ser. No. 15/208,483, filed May 12, 2016 (now U.S. Pat. No. 9,514,663)
U.S. patent application Ser. No. 15/208,521, filed May 12, 2016 (now U.S. Pat. No. 9,524,661)
U.S. patent application Ser. No. 15/216,562, filed May 21, 2016 (now U.S. Pat. No. 9,659,511)
U.S. patent application Ser. No. 15/216,595, filed Jul. 21, 2016 (now U.S. Pat. No. 9,542,870)
U.S. patent application Ser. No. 15/413,277, filed Jan. 23, 2017 (now U.S. Pat. No. 9,734,738)
U.S. patent application Ser. No. 15/413,306, filed Jan. 23, 2017 (now U.S. Pat. No. 9,732,932)
U.S. patent application Ser. No. 15/429,320, filed Feb. 10, 2017 (now U.S. Pat. No. 9,685,102)
U.S. patent application Ser. No. 15/627,089, filed Jun. 19, 2017 (co-pending)
U.S. patent application Ser. No. 15/676,823, filed Aug. 14, 2017 (co-pending)

TECHNICAL FIELD

The following disclosure relates to lighting systems and, more particularly, to lighting systems using light emitting diodes to externally illuminate signs.

SUMMARY

The present invention, in one aspect thereof, comprises a back panel for use in a light emitting diode (LED) lighting assembly. An extruded substrate formed of a thermally conductive material is provided, the substrate having a plurality of fins extending from a first side of the substrate, each of the fins having a substantially rectangular shape oriented so that a longitudinal axis of the fin is substantially parallel to a longitudinal axis of the substrate. At least some of the fins include a hole formed through the fin to enable heated air to rise through the fins. A plurality of LEDs are mounted on a second side of the substrate, and oriented in a longitudinal orientation with the fins oriented parallel to the bottom edge of a surface to be illuminated, such that heat rises perpendicular to the surface of the fin.

BRIEF DESCRIPTION OF THE DRAWINGS

For a more complete understanding, reference is now made to the following description taken in conjunction with the accompanying drawings in which:

FIG. 1A illustrates one embodiment of a billboard that may be externally lighted by one or more lighting assemblies;

FIGS. 1B-1D illustrate embodiments of angular positions of the lighting assembly of FIG. 1 relative to the billboard;

FIGS. 5A, 5B, 5C and 5D illustrate one embodiment of an optics panel that may be used with the lighting assembly of FIG. 2;

FIGS. 8B-8J illustrates embodiments of the optics panel of FIG. 8A and optical elements that may be used to form part of the optics panel.

DETAILED DESCRIPTION OF ILLUSTRATIVE EMBODIMENTS

Figure 2:
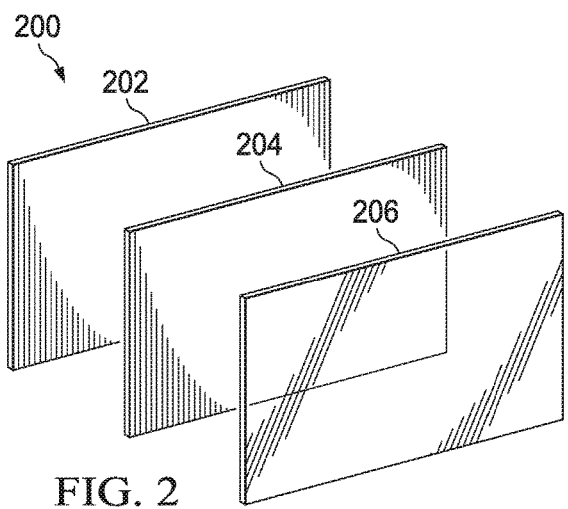
FIG. 2 illustrates one embodiment of a lighting assembly that may be used to light the billboard of FIG. 1.

Billboards, such as those commonly used for advertising in cities and along roads, often have a picture and/or text that must be externally illuminated to be visible in low-light conditions. As technology has advanced and introduced new lighting devices such as the light emitting diode (LED), such advances have been applied to billboards. However, current lighting designs have limitations and improvements are needed. Although billboards are used herein for purposes of example, it is understood that the present disclosure may be applied to lighting for any type of sign that is externally illuminated.

Referring to FIG. 1A, one embodiment of a billboard 100 is illustrated. The billboard 100 includes a surface 102 onto which a picture and/or text may be painted, mounted, or otherwise affixed. The surface 102 may be any size, such as a commonly used size having a width of forty-eight feet wide and a height of fourteen feet. The surface 102 may be provided by placing a backing material on a frame 104 made of steel and/or other materials. The frame 104 may be mounted on one or more support poles 106, which may be considered part of the frame 104 or separate from the frame 104. The billboard 100 may include a walkway or other support structure 108 that enables the surface 102 to be more easily accessed.

One or more lighting assemblies no may be coupled to the walkway 108 (e.g., to a safety rail or to the walkway itself) and/or to another structural member of the billboard 100 to illuminate some or all of the surface 102 in low light conditions. The lighting assembly no may be mounted at or near a top edge 112 of the billboard 100, a bottom edge 114 of the billboard 100, a right edge 116 of the billboard 100, and/or a bottom edge 118 of the billboard 100. The lighting assembly no may be centered (e.g., located in approximately the center of the billboard 100) or off center as illustrated in FIG. 1A.

With additional reference to FIGS. 1B-1D, a surface 120 of the lighting assembly no may be parallel with respect to the surface 102 of the billboard 100 (FIG. 1B), may be perpendicular with respect to the surface 102 (FIG. 1C), or may be angled with respect to the surface 102 (FIG. 1D). It is understood that the lighting assembly no may be placed in many different orientations and locations relative to the billboard 100 and to one another, and the illustrated positions are only for purposes of example. Furthermore, it is understood that references to "top," "bottom," "left," and "right" are used in the present disclosure for purposes of description and do not necessarily denote a fixed position. For example, the billboard 100 may be turned on end, and the referenced "top," "bottom," "left," and "right" edges may still be readily identifiable although the "top" edge would be the "left" edge or the "right" edge.

One problem with current lighting technology is that it can be difficult to direct light only onto the surface 102 and even more difficult to do so evenly. This may be due partly to the placement of the lighting assembly 110, as shown in FIGS. 1B-1D. As the lighting assembly 110 is off center relative to the surface 102, light emitted from the lighting assembly 110 may not evenly strike the surface 102. One problem with uneven illumination is that certain parts of the surface 102 may be more brightly illuminated than other parts. This creates "hot spots" that may be undesirable. Attempting to evenly illuminate the surface 102 may cause light to be directed past the edges 112, 114, 116, and 118 as attempts are made to balance out hot spots in particular areas. However, light that does not strike the surface 102 is wasted and may create problems (e.g., light pollution), as well as waste illumination that could be used for the surface 102.

In addition to the difficulties of evenly illuminating the surface 102, the use of LEDs in an exterior lighting environment involves issues such as heat dissipation and protecting the LEDs against environmental conditions such as moisture. The presence of moving mechanical features such as fans that may be used to provide increased airflow for cooling may create additional reliability problems. Due to the difficulty and expense of replacing and/or repairing the lighting assembly no in combination with the desire to provide consistent lighting while minimizing downtime, such issues should be addressed in a manner that enhances reliability and uptime.

Referring to FIG. 2, one embodiment of a lighting assembly 200 is illustrated. The lighting assembly 200 provides a more detailed embodiment of the lighting assembly 110 of FIG. 1. The lighting assembly 200 includes a back panel 202, a light panel 204 (e.g., a printed circuit board (PCB)) having a plurality of LEDs (not shown) mounted thereon, and an optics panel 206. As will be described below in more detailed examples, light from the LEDs of the light panel 204 may be directed by the optics panel 206 to illuminate the surface 102 of the billboard 100 of FIG. 1. The back panel 202 may be configured to serve as a supporting substrate for the light panel 204 and optics panel 206, as well as to dissipate heat produced by the LEDs.

It is understood that any of the back panel 202, light panel 204, and optics panel 206 may actually be two or more physical substrates rather than a single panel as illustrated in FIG. 2. Furthermore, it is understood that there may be additional panels positioned behind the back panel 202, in front of the optics panel 206, and/or between the back panel 202 and light panel 204 and/or between the light panel 204 and optics panel 206.

Figure 3B:
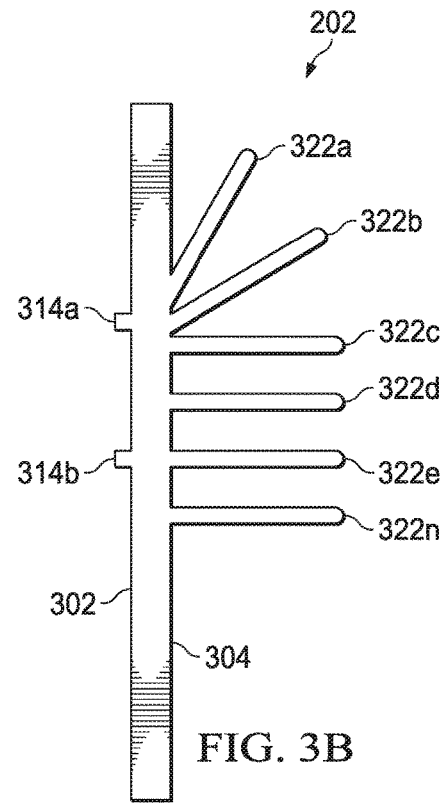
FIGS. 3A and 3B illustrate one embodiment of a back panel that may be used in the lighting assembly of FIG. 2.
Figure 3A:
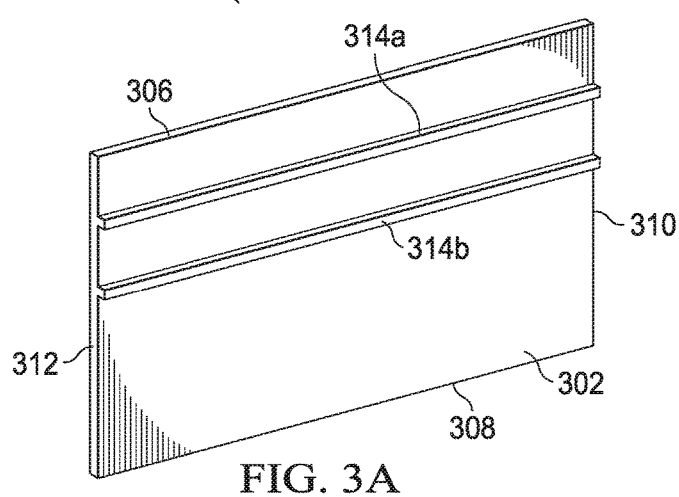
Figure 3C:
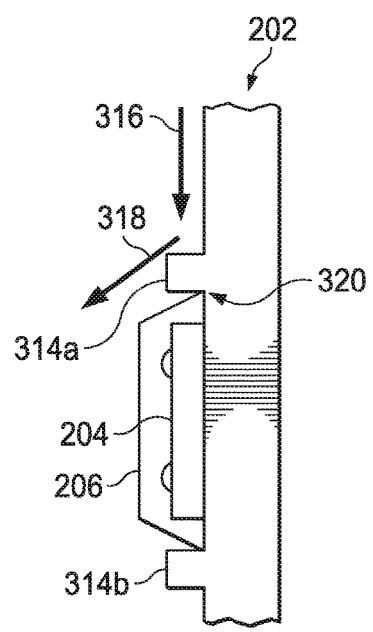
FIG. 3C illustrates one embodiment of the back panel of FIGS. 3A and 3B with a light panel and an optics panel that may also be used in the lighting assembly of FIG. 2.

Referring to FIGS. 3A-3C, one embodiment of the back panel 202 is illustrated with a front surface 302 and a back surface 304. The back panel 202 includes a top edge 306, a bottom edge 308, a right edge 310, and a left edge 312. The panel 202 may be formed of one or more thermally conductive materials (e.g., aluminum) and/or other materials.

The front surface 302 provides a mounting surface for the light panel 204. In some embodiments, the front surface 302 of the panel 202 may include one or more protrusions 314a and 314b that are substantially parallel to the top edge 306. The protrusions 314a and 314b may be configured to protect the light panel 204 from moisture. Although only two protrusions 314a and 314b are illustrated, it is understood that a single protrusion may be provided or three or more protrusions may be provided. Furthermore, such protrusions may vary in length, shape (e.g., may have angled or curved surfaces), orientation, and/or location on the front surface 302.

Referring specifically to FIG. 3C, a light panel 204 and an optical panel 206 may be mounted under the protrusion 314a (FIG. 3C). Moisture running down the front surface 302 in the direction of arrow 316 may strike the protrusion 314a and be directed away from the light panel 204 and optical panel 206 as shown by arrow 318. Although not shown, moisture may also be directed length down the protrusion 314a. Accordingly, protrusion 314a may serve as a gutter and aid in directing moisture away from a joint 320 where the optical panel 206 abuts the front surface 302. This may be beneficial even when a moisture resistant compound is used to seal the joint 320. In embodiments where there are multiple light panels 204 arranged vertically on the front surface 302, there may be a protrusion positioned above each light panel 204. For example, the protrusion 314a may be positioned directly above one light panel 204 and the protrusion 314b may be positioned directly above another light panel 204.

Referring specifically to FIG. 3B, the back surface 304 may be configured to increase heat dissipation. For example, the back surface 304 may be configured with a heat sink provided by fins 322a-322N, where N denotes a total number of fins. The fins 322a-322N increase the surface area of the back surface 304, thereby providing for additional heat dissipation to the surrounding air. The fins 322a-322N may be formed as part of the panel 202 or may be otherwise coupled to the panel 202 (e.g., may be part of a discrete heat sink that is coupled to the back surface 304). Some or all of the fins 322a-322N may be angled, as shown by fins 322a and 322b. In some embodiments, holes (not shown) may be provided in some or all of the fins 322a-322N to aid in air circulation. In such embodiments, the holes may cause a chimney effect in which heated air rises through the holes and is replaced by cooler air. This may be particularly effective in environments where natural air movement is limited.

Figure 4B:
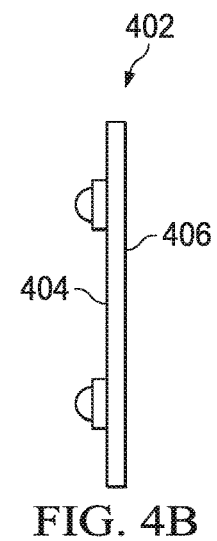
FIGS. 4A and 4B illustrate one embodiment of a light panel that may be used with the lighting assembly of FIG. 2.
Figure 4A:
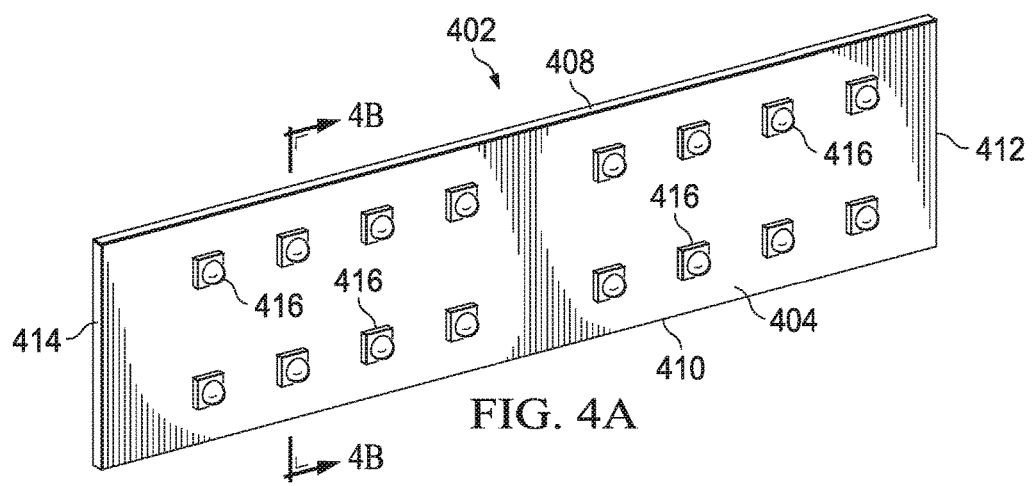

Referring to FIGS. 4A and 4B, one embodiment of a single PCB 402 of the light panel 204 is illustrated. In the present example, the light panel 204 may include multiple PCBs 402, although it is understood that any number of PCBs may be used based on design issues such as the amount of illumination needed, the amount of illumination provided by a single PCB 402, the size of the surface 102 of the billboard 100, and/or other factors. As shown in the present embodiment with a substantially rectangular cross-section, the PCB 402 includes a front surface 404, a back surface 406, a top edge 408, a bottom edge 410, a right edge 412, and a left edge 414.

The PCB 402 may include one or more strings of LEDs 416, with multiple LEDs 416 in a string. For example, a string may include eight LEDs 416 and each PCB 402 may include two strings for a total of sixteen LEDs 416. In this configuration, a light panel 204 having eight PCBs 402 would include ninety-six LEDs 416. It is understood that although the PCBs 402 are shown as being substantially identical, they may be different in terms of size, shape, and other factors for a single light panel 204.

In the present example, the LEDs 416 are surface mounted, but it is understood that the LEDs 416 may be coupled to the panel 204 using through hole or another coupling process. The surface mounted configuration may ensure that a maximum surface area of each LED 416 is in contact with the PCB 402, which is in turn in contact with the back panel 202 responsible for heat dissipation. Each string of LEDs may receive a constant current with the current divided evenly among the LEDs 416.

Referring to FIGS. 5A, 5B, 5C and 5D, one embodiment of a single lens panel 500 of the optics panel 206 is illustrated. In the present example, the optics panel 206 may include multiple lens panels 500, although it is understood that any number of lens panels may be used based on design issues such as the number, arrangement, and orientation of the LEDs 416, the size of the surface 102, and/or other factors. As shown in the present embodiment with a substantially rectangular cross-section that is configured for use with the PCB 402 of FIG. 4, a single lens panel 500 includes a front surface 502, a back surface 504, a top side 506, a bottom side 508, a right side 510, and a left side 512. The sides 506, 508, 510, and 512 may form a cavity into which the PCB 402 may fit, thereby providing protection for the PCB 402 from environmental conditions such as moisture.

The lens panel 500 may include a beveled or angled top side 506 and/or bottom side 508 as illustrated in FIG. 5B. The beveling/angling may aid in preventing moisture from reaching the PCB 402 under the lens panel 500, as water will more readily flow from the area of the joint 320 (FIG. 3C) due to the angled surface than if the top side 506 was relatively flat.

The lens panel 500 may include multiple optical elements 514. A single optical element 514 may be provided for each LED 416, a single optical element 514 may be provided for multiple LEDs 416, and/or multiple optical elements 514 may be provided for a single LED 416. In some embodiments, the optical elements 514 may be provided by a single multi-layer optical element system provided by the lens panel 500.

In the present example, the optical elements 514 are configured so that the light emitted from each LED 416 is projected onto the entire surface 102 of the billboard 100. In other words, if all other LEDs 416 were switched off except for a single LED 416, the entire surface 102 would be illuminated at the level of illumination provided by the single LED 416. In one embodiment, the rectangular target area of the surface 102 would be evenly illuminated by the LED 416, while areas beyond the edges 112, 114, 116, and 118 would receive no illumination at all or at least a minimal amount of illumination from the LED 416. What is meant by "evenly" is that the illumination with a uniformity that achieves a 3:1 ratio of the average illumination to the minimum. Thus, by designing the lens in such a manner, when all LEDs are operating, the light form the collective thereof will illuminate the surface at the 3:1 ratio. When one or more LEDs fail, the overall illumination decreases, but the uniformity maintains the same uniformity. Also, as described hereinabove, the "surface" refers to the surface that is associated with a particular LED panel. It may be that an overall illuminated surface is segmented and multiple panels are provided, each associated with a particular segment.

FIG. 5C illustrates a detail of the lens assembly. Each of the diodes 416 is mounted on the board 408 at a minimum distance. Overlying the board and LEDs 416 is transparent lens substrate 520. This substrate 520 has a plurality of lens structures 522, each associated with one of the LEDs 416, such that each of the LEDs 416 has the light emitted therefrom directed outward towards the surface, each lens structure being substantially the same. The minimum distance is designed such that overlapping light from adjacent LEDs does not create interference patterns and result in dead spots on the surface. The lens structure 522 is designed to create the 3:1 uniformity and also, the lens structure is designed to "direct" the light from an edge of the surface to cover the entire surface. This is shown by the angle of the light rays in FIG. 5C. Also, the beveled edge 530 will basically surround the PCB 402, thus protecting it from moisture. The lens substrate 520 is secured with screws (not shown).

FIG. 5D illustrates a detail of the lens structure 522. This structure includes an interior surface 524 and an exterior surface 526 that shapes and directs the light in the correct pattern. This is an acrylic material. With such a design, the lighting assembly can be disposed at an edge of the surface to illuminate the entire surface.

In some embodiments, as shown in FIG. 1, two lighting assemblies no may be used. Each lighting assembly may be powered by a separate power supply (not shown), and may be configured to illuminate the entire surface 102. In such an embodiment, if one power supply fails, the remaining lighting assembly 110 will still illuminate the entire surface 102, although at a lesser intensity than when both lighting assemblies 110 are functioning. This provides evenly distributed illumination when both lighting assemblies 110 are functioning correctly, and continues to provide evenly distributed illumination when one lighting assembly 110 malfunctions. Accordingly, the entire surface 102 of the billboard 100 may be illuminated even when an entire lighting assembly 110 has malfunctioned and is providing no illumination at all due to the redundancy provided by configuration of the lighting assemblies 110.

Furthermore, in some embodiments as described above, each LED 416 of a single lighting assembly 110 may be configured via the optical elements 514 to illuminate the entire surface 102. In such embodiments, if one or more LEDs 416 or strings of LEDs fails, the remaining LEDs 416 will still illuminate the entire surface 102, although at a lesser intensity than when the failed LEDs 416 are functioning. This provides evenly distributed illumination when all LEDs 416 are functioning correctly, and continues to provide evenly distributed illumination when one or more LEDs are malfunctioning. Accordingly, the billboard 100 may be illuminated even when multiple LEDs 416 have malfunctioned and are providing no illumination at all due to the redundancy provided by configuration of the lighting assemblies 110.

It is understood that some embodiments may direct substantially all illumination from a lighting assembly 110 evenly across the surface 102 while some illumination is not evenly distributed. For example, substantially all LEDs 416 may be directed to each evenly illuminate the surface 102 with the exception of a relatively small number of LEDs 416. In such cases, the illumination provided by the remaining LED or LEDs 416 may be directed to one or more portions of the surface 102. If done properly, this may be accomplished while minimizing any noticeable unevenness in the overall illumination, even if one of the remaining LEDs 416 malfunctions. For example, the lighting assembly 110 may be configured to direct the illumination provided by one LED 416 to only the left half of the surface 102, while directing the illumination from another LED 416 to only the right half of the surface 102. The loss of one of these two LEDs may not noticeably impact the illumination of the surface 102. It is understood that such variations are within the scope of this disclosure.

In embodiments where the illumination is evenly distributed across the surface 102, it is understood that the optics panel 206 may be configured specifically for the light panel 204 and the surface 102. For example, assuming the surface 102 is forty-eight feet wide and sixteen feet high, the lens panel 500 of FIG. 5 may be specifically designed for use with the PCB 402 of FIG. 4. This design may be based on the particular layout of the PCB 402 (e.g., the number and arrangement of the LEDs 416), the amount of illumination provided by the LEDs 416, the size of the surface 102, the distance between the lens panel 500 and the surface 102, the angle at which the lens panel 500 is mounted relative to the surface 102 (e.g., FIGS. 1B-1D), and/or other factors. Accordingly, changes in any of these factors may entail a change in the design of the lens panel 500 in order to again evenly distribute the illumination provided by each LED 416 across the entire surface 102. It is understood that various standard configurations of the lighting assembly 110 may be developed for various billboard and/or other externally illuminated signs so that a particular configuration may be provided based on the parameters associated with a particular billboard and/or externally illuminated sign.

Figure 6A:
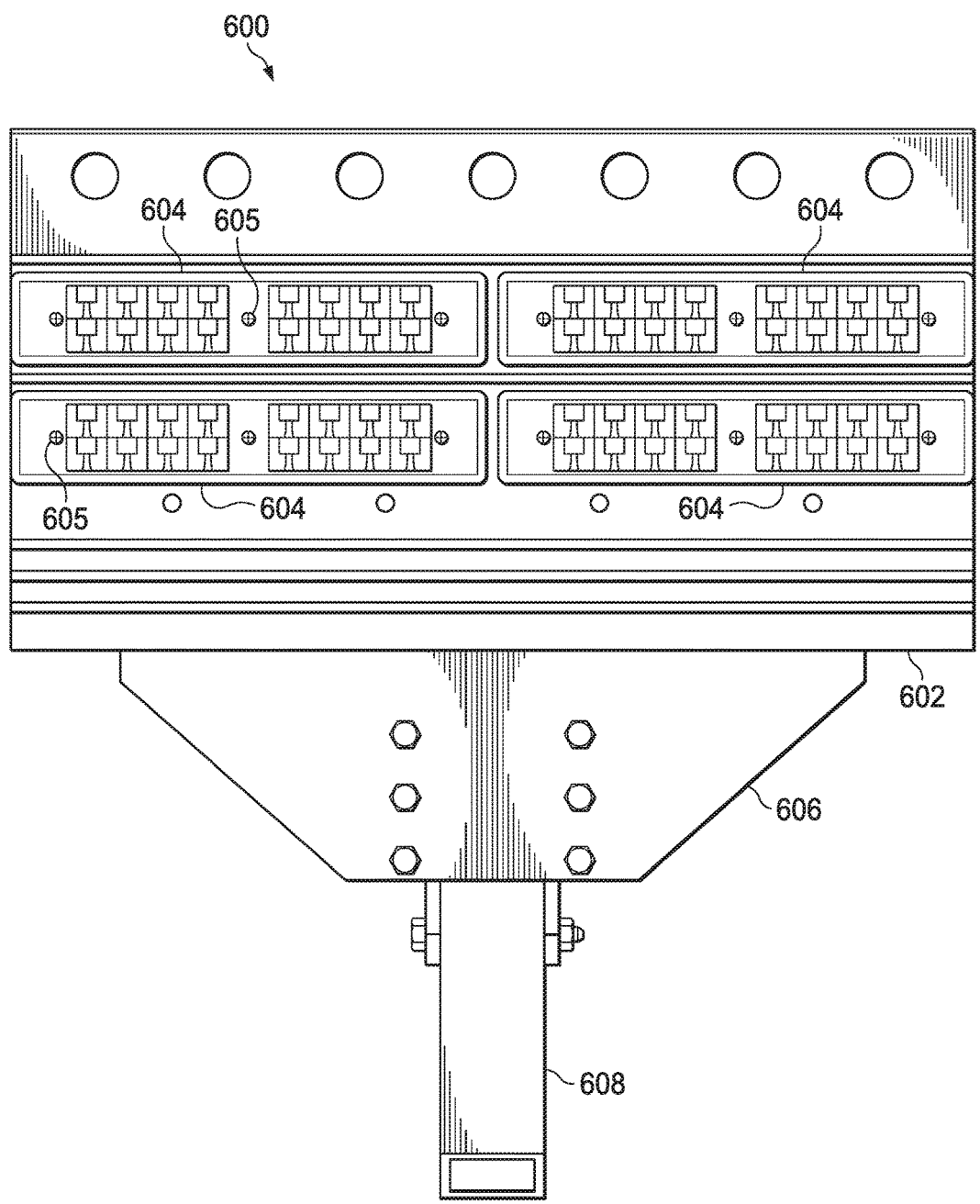
FIGS. 6A-6C illustrate a more detailed embodiment of the lighting assembly of FIG. 2.
Figure 6B:
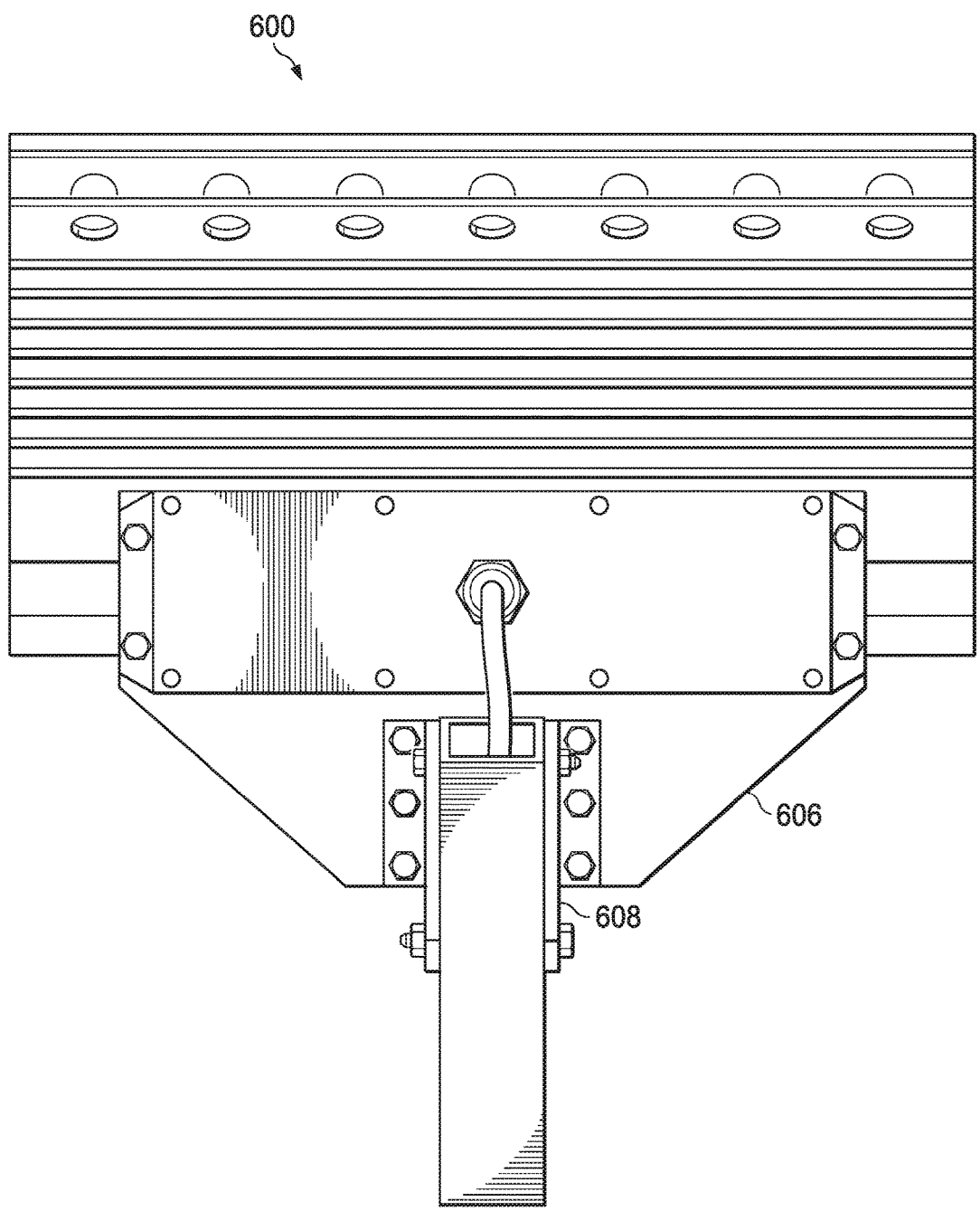
Figure 6C:
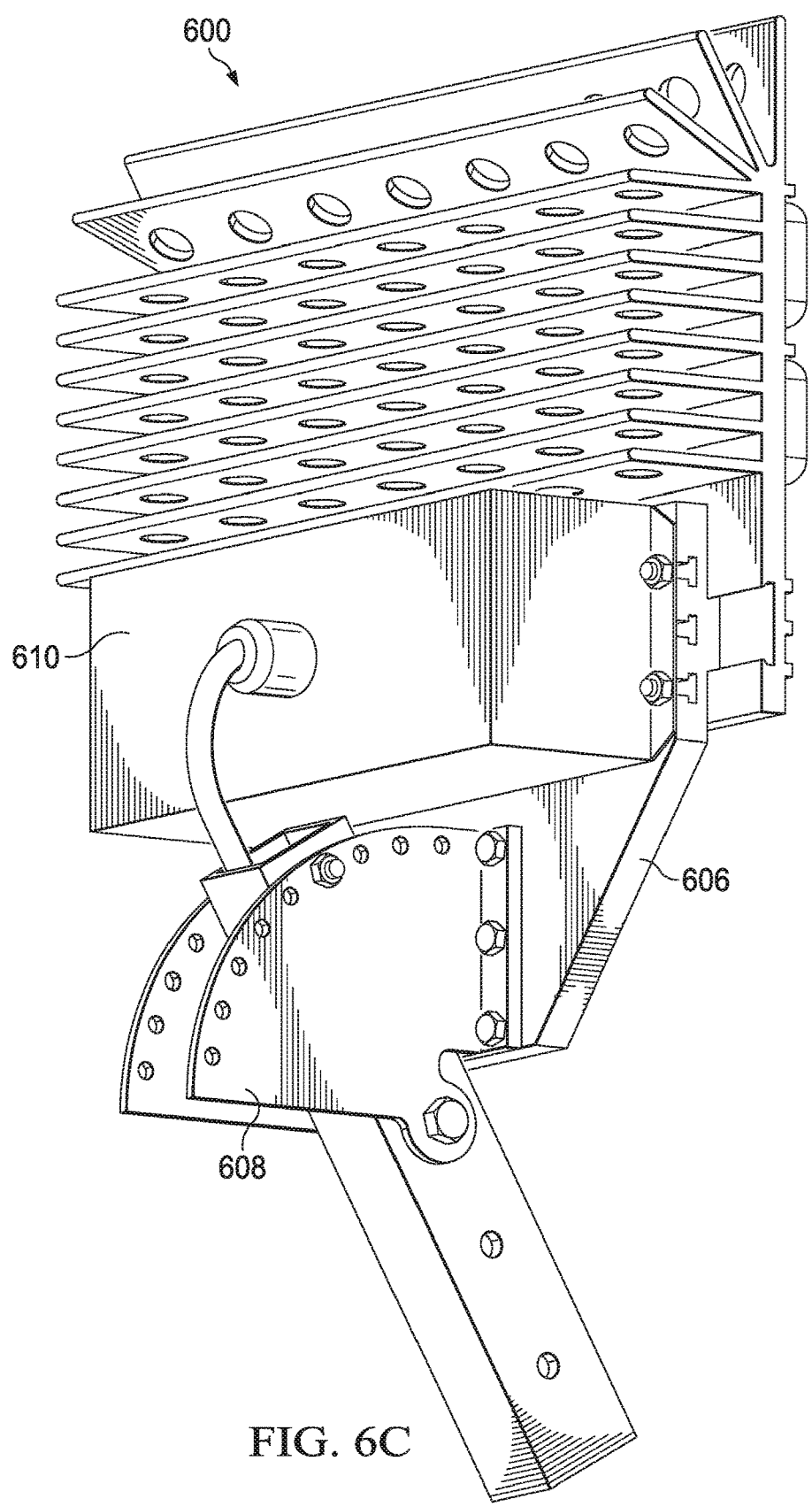

Referring to FIGS. 6A-6C, one embodiment of a lighting assembly 600 is illustrated that provides a more detailed embodiment of the lighting assembly 200 of FIG. 2. The lighting assembly 600 includes a back panel 602, a light panel formed by multiple LED assemblies (denoted by reference number 800 in FIG. 8A), and an optics panel formed by multiple lens panels 604. Accordingly, as described previously, the light panel 204 in the current example is represented by multiple LED assemblies 800 and the optics panel 206 is represented by multiple lens panels 604. In the present embodiment, the lighting assembly 600 includes four LED assemblies 800 and four lens panels 604.

Although various attachment mechanisms (e.g., threaded screws, bolts, and/or other fasteners) may be used to coupled the lens panels and LED assemblies to the back panel 602, the present embodiment uses multiple threaded fasteners 605 (e.g., screws) that extend through the lens panels and the LED assemblies and engage threaded holes in the back panel 602.

The lighting assembly 600 is also illustrated with a mounting plate 606 that couples to the back panel 602 and to an adjustable mounting bracket 608. The adjustable mounting bracket 608 may be used to couple the lighting assembly 600 to a portion of the billboard 100 (FIG. 1) and/or to another support member. A power supply enclosure 610 may be coupled to the mounting plate 606 and configured contain a power supply (not shown) capable of supplying power to LEDs of the LED assemblies 800. It is noted that separating the power supply from the back panel 602 may aid in heat dissipation by the back panel 602 as it does not have to dissipate heat from the power supply to the same extent as if the power supply was mounted directly to the back panel 602.

The location of the power supply may also be beneficial as snow not melted by the heat produced by the LED may be melted by heat produced by the power supply. This may aid in reducing snow buildup on the LEDs.

Figure 7A:
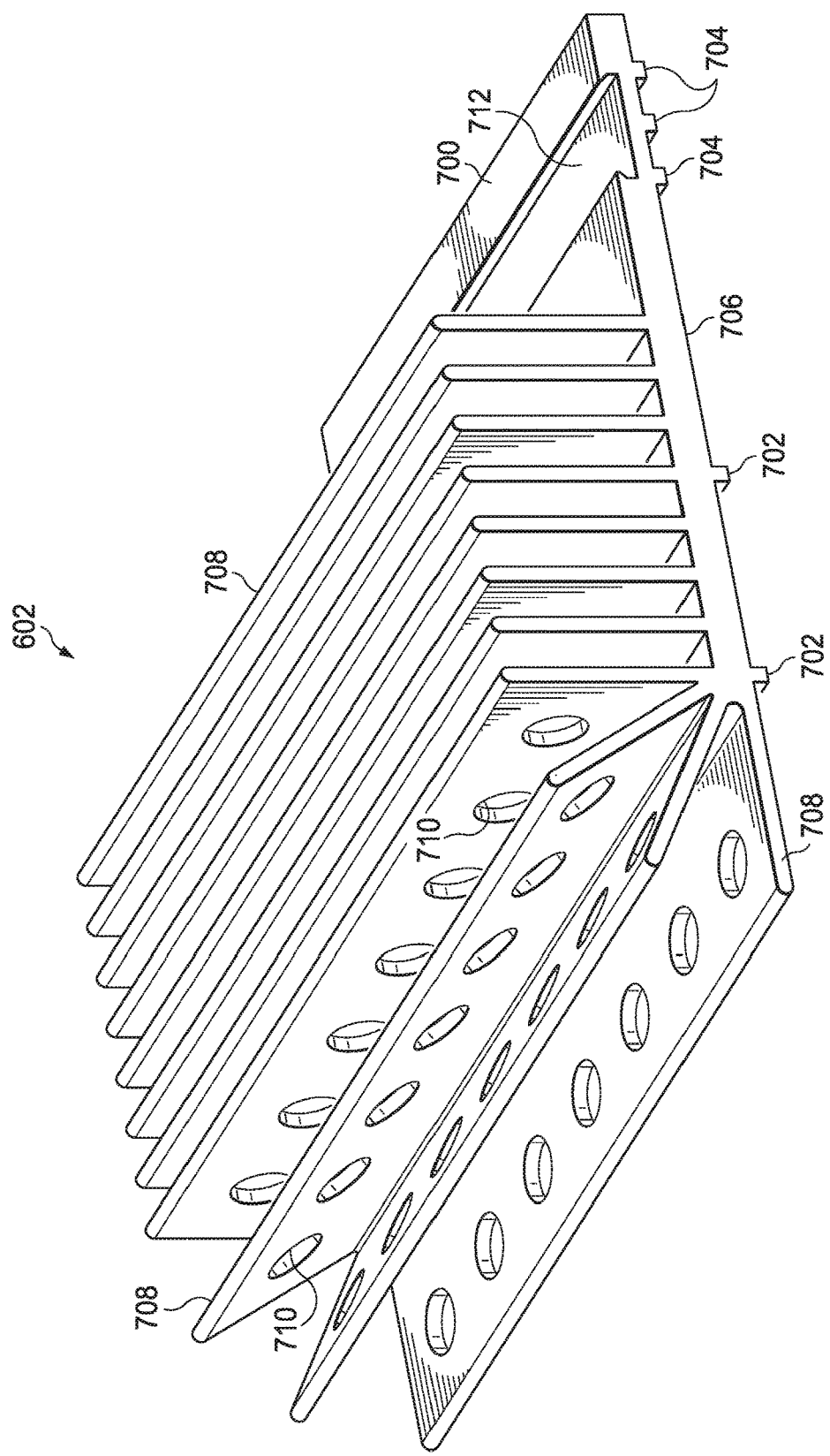
FIGS. 7A and 7B illustrate an embodiment of a back panel that may be used with the lighting assembly of FIGS. 6A-6C.
Figure 7B:
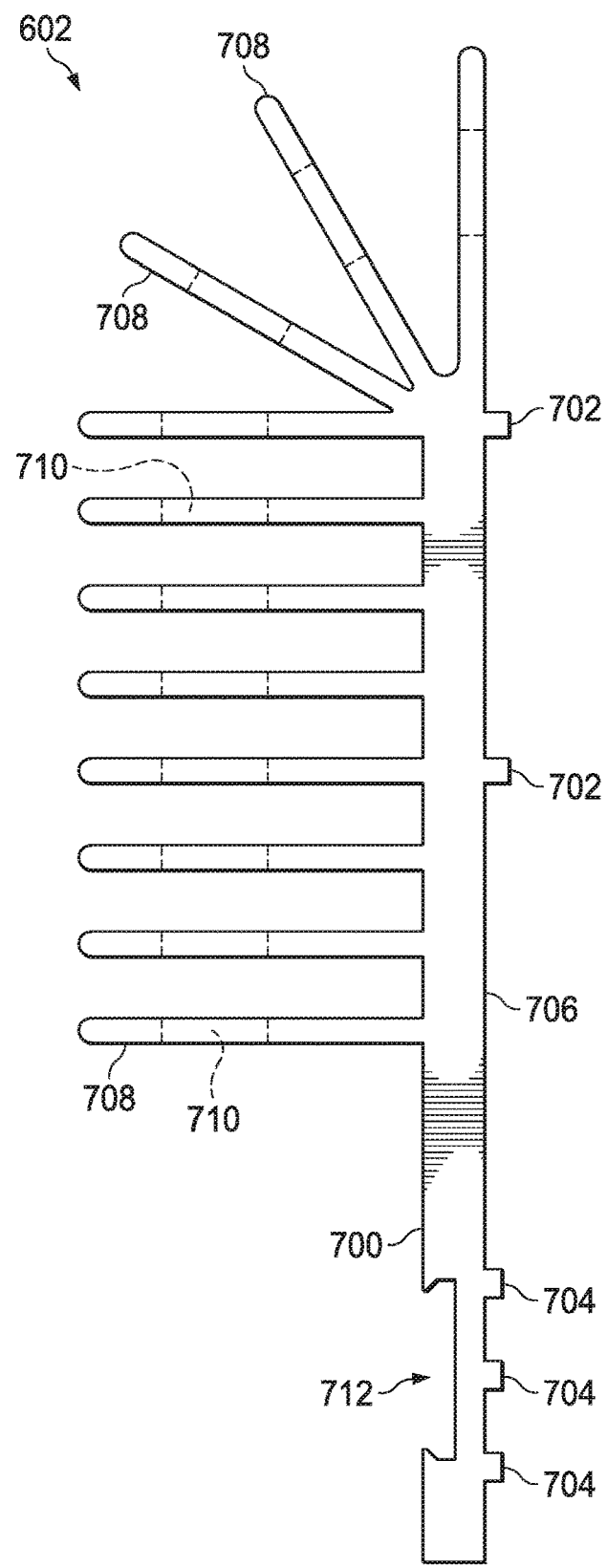

With additional reference to FIGS. 7A and 7B, one embodiment of the back panel of FIG. 602 is illustrated. A front surface 700 includes multiple protrusions 702 that may be configured to protect the light panels (not shown) against moisture as previously described. The front surface 700 may include additional protrusions 704.

A back surface 706 includes multiple fins 708 that form a heat sink to aid in the dissipation of heat from the back panel 602. In the present example, the fins 708 are substantially rectangular in shape. In the present example, the back panel 602 is extruded and the fins 708 run parallel to the top edge with a longitudinal axis of each fin 708 being substantially parallel to a longitudinal axis of the back panel 602. Forming the fins 708 in a vertical manner is possible, but may increase the cost of the back panel 602 due to the extrusion process. As shown, the fins 708 may be substantially perpendicular to the back surface 706, and/or may be angled. In the present example, the fins 708 are angled such that near the top of the back panel 702, the fins 708 are angled towards the top.

Because the fins 708 are parallel to the top edge, heat may be trapped due to its inability to rise vertically. Accordingly, holes 710 may be present in some or all of the fins 708 (marked but not actually visible in the side view of FIG. 7B) to provide paths for the heat to rise vertically in spite of the orientation of the fins 708. The holes 710 may create a chimney effect that increases air flow across the fins 708 and aids in the cooling process. In some embodiments, some or all of the fins 708 may be angled such that heat is not trapped.

The back surface 706 may also include a groove 712 that is configured to receive a tongue of the mounting plate 606 in a tongue-in-groove manner.

With additional reference to FIGS. 8A-8J, embodiments of a single LED assembly 800 and a single lens panel 604 that may be used with the lighting assembly 600 are illustrated. As shown, the single LED assembly 800 and the single optics panel 604 may be configured for use together.

Figure 8A:
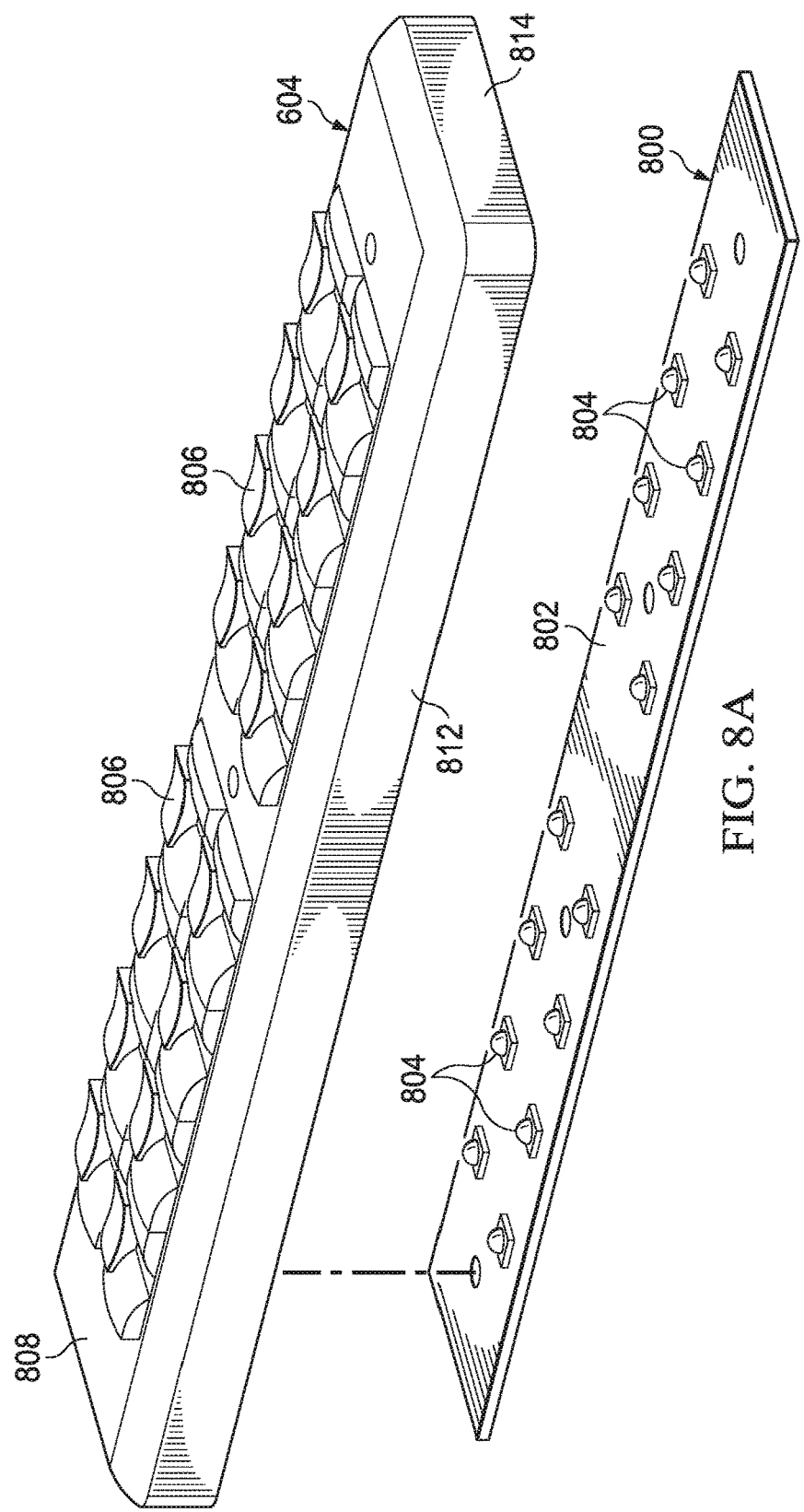
FIG. 8A illustrates an embodiment of an LED assembly and an optics panel that may be used with the lighting assembly of FIG. 6.

Referring specifically to FIG. 8A, the LED assembly 800 includes a substrate 802 (e.g., a PCB) onto which are mounted multiple LEDs 804. In the present example, the LED assembly 800 includes two strings of eight LEDs 804 each for a total of sixteen LEDs 804. It is understood that this is merely an example, and there may be more or fewer LEDs 804 on the light panel 800, and the LEDs 804 may be arranged in many different ways on the substrate 802.

Referring also to FIGS. 8B-8J, the optics panel 604 may include optical elements 806 arranged on an upper surface 808 of the optics panel 604. The optics panel 604 may further include sides 810, 812, 814, and 816 that are configured to fit around the edge of the substrate 802 of the light panel 800. The bottom edge of each side 810, 812, 814, and 816 abuts the front surface 700 of the back panel 602 and may be sealed to the front surface 700 using a moisture resistant sealant.

As shown in FIGS. 8D-8H, a single optical element 806 may include multiple lens elements designed to distribute the illumination provided by a single LED 804 across a surface such as the surface 102 of FIG. 1. A first lens element 820 may be positioned proximate to the LED 804, and additional lens elements 822, 824, and 826 may be positioned above the lens element 820. Multiple optical elements 806 may be combined and formed as a single optics panel 604 that is configured to operate with the LED assembly 800.

Figure 9:
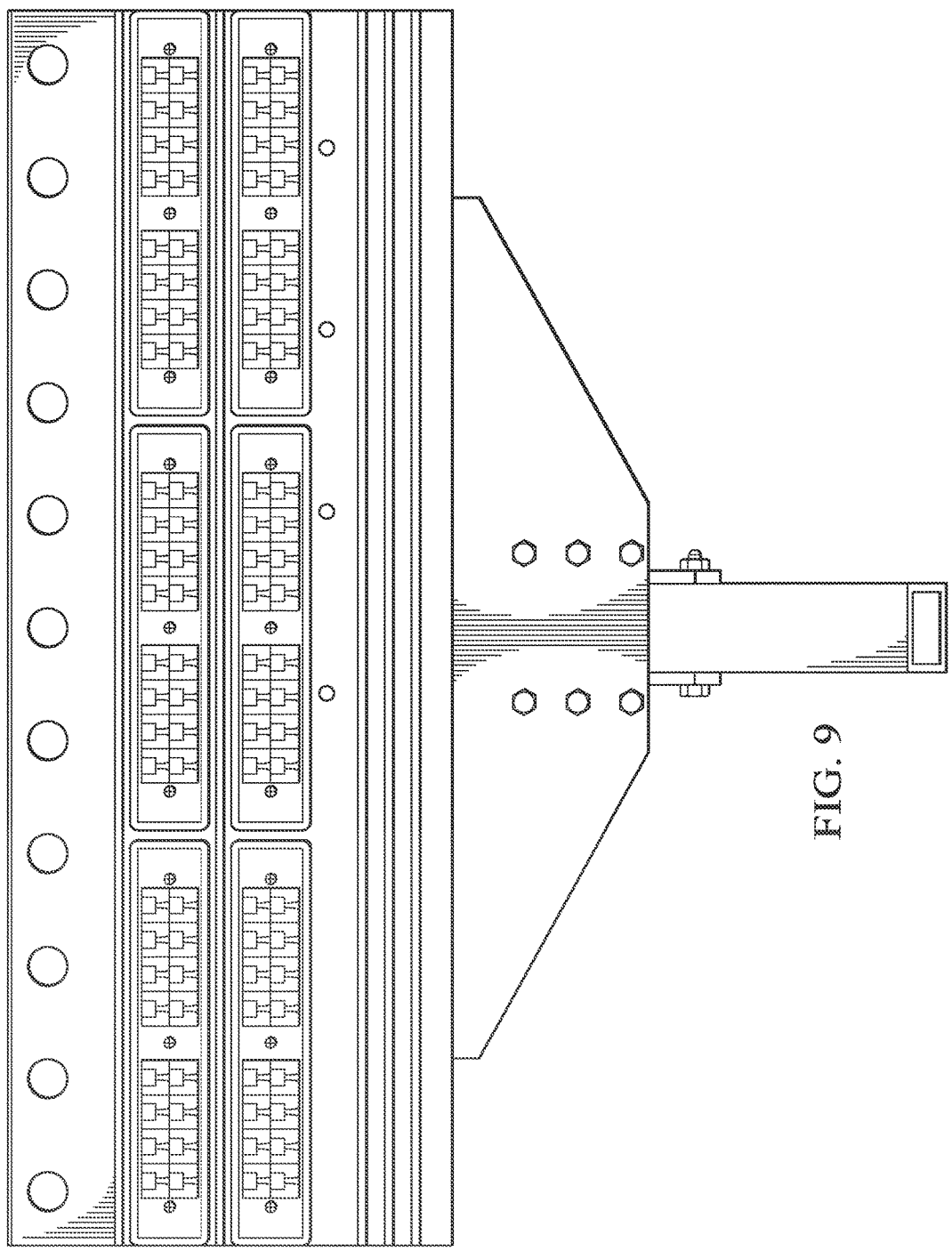
FIG. 9 illustrates a more detailed embodiment of the lighting assembly of FIG. 2.

Referring to FIG. 9, another embodiment of a lighting assembly 900 is illustrated that provides a more detailed embodiment of the lighting assembly 200 of FIG. 2. The lighting assembly 900 is similar to the lighting assembly 600 of FIG. 6, but includes six LED assemblies rather than the four six LED assemblies of the lighting assembly 600. It is understood that the lighting assembly 900 may require a larger power supply than the lighting assembly 600 (e.g., a one hundred and fifty watt power supply instead of a one hundred and twenty watt power supply).

Although the preferred embodiment has been described in detail, it should be understood that various changes, substitutions and alterations can be made therein without departing from the spirit and scope of the invention as defined by the appended claims.

What is claimed is:

1. A method of illuminating a rectangular surface using a first lighting assembly and a second lighting assembly that each include a plurality of LEDs and a plurality of optical elements, each optical element overlying a respective one of the LEDs, the surface being divided into only a first portion and an adjacent non-overlapping second portion, the method comprising the steps of:
    directing light from the first lighting assembly toward the first portion of the surface such that the light from the first lighting assembly is directed across the entire first portion of the surface; and
    at the same time, directing light from the second lighting assembly toward the second portion of the surface such that the light from the second lighting assembly is directed across the entire second portion of the surface;
    wherein when all LEDs of the first lighting assembly are operating, the entire first portion of the surface is illuminated with an illumination level and a uniformity, and wherein failure of one or more LEDs of the first lighting assembly will cause the illumination level of light impinging the first portion of the surface to decrease while the uniformity of light impinging the first portion of the surface remains substantially the same; and
    wherein when all LEDs of the second lighting assembly are operating, the entire second portion of the surface is illuminated with an illumination level and a uniformity, and wherein failure of one or more LEDs of the second lighting assembly will cause the illumination level of light impinging the second portion of the surface to decrease while the uniformity of light impinging the second portion of the surface remains substantially the same.

2. The method of claim 1, wherein the uniformity across both the first and second portions achieves at most a 3:1 ratio of the average illumination to the minimum illumination whether all or only some of the LEDs are operating.

3. The method of claim 1, wherein the first lighting assembly comprises a first lighting unit and wherein the second lighting assembly comprises a second lighting unit;
    wherein the first lighting unit comprises a first group of the plurality of LEDs arranged on a first circuit board; and
    wherein the second lighting unit comprises a second group of the plurality of LEDs arranged on a second circuit board.

4. The method of claim 1, wherein the first lighting assembly comprises a first lighting unit and a second lighting unit, and wherein the second lighting assembly comprises a third lighting unit and a fourth lighting unit;
    wherein the first lighting unit comprises a first group of the plurality of LEDs arranged on a first circuit board;
    wherein the second lighting unit comprises a second group of the plurality of LEDs arranged on a second circuit board;
    wherein the third lighting unit comprises a third group of the plurality of LEDs arranged on a third circuit board; and
    wherein the fourth lighting unit comprises a fourth group of the plurality of LEDs arranged on a fourth circuit board.

5. The method of claim 1, wherein the first lighting assembly comprises a first lighting unit, a second lighting unit, and a third lighting unit and wherein the second lighting assembly comprises a fourth lighting unit, a fifth lighting unit and a sixth lighting unit;
    wherein the first lighting unit comprises a first group of the plurality of LEDs arranged on a first circuit board;
    wherein the second lighting unit comprises a second group of the plurality of LEDs arranged on a second circuit board;
    wherein the third lighting unit comprises a third group of the plurality of LEDs arranged on a third circuit board;
    wherein the fourth lighting unit comprises a fourth group of the plurality of LEDs arranged on a fourth circuit board;
    wherein the fifth lighting unit comprises a fifth group of the plurality of LEDs arranged on a fifth circuit board; and
    wherein the sixth lighting unit comprises a sixth group of the plurality of LEDs arranged on a sixth circuit board.

6. The method of claim 1, wherein the optical elements of the first lighting assembly and of the second lighting assembly are substantially the same.

7. The method of claim 1, wherein the LEDs are arranged in a plurality of rows, the LEDs being arranged such that overlapping light from adjacent LEDs does not create interference patterns that result in dead spots on the surface.

8. The method of claim 1, wherein the optical elements each comprise a lens with a first part, a second part, and a third part, wherein the first part comprises a first curved surface, wherein the second part comprises a second curved surface that intersects with the first curved surface at a region between the first part and the second part, wherein the first part and the second part each have a peak relative to a circuit board of the associated LED, the peak being spaced from the region between the first part and the second part, and wherein the third part extends beyond the region between the first part and the second part in a direction away from the associated LED.

9. The method of claim 1, wherein the first portion and the second portion are portions of a billboard display surface that extend from a left edge of the billboard display surface to a right edge of the billboard display surface and from a top edge to a bottom edge of the billboard display surface so that all of the billboard display surface is illuminated by the first and second lighting assemblies.

10. A method of illuminating a rectangular surface using a first lighting unit and a second lighting unit that each include a circuit board, a plurality of LEDs arranged on the circuit board, and a plurality of optical elements, wherein each optical element of the plurality of optical elements of the first and second lighting units overlies a respective one of the LEDs of the first and second lighting units, and wherein each optical element of the plurality of optical elements of the first and second lighting units is configured to redirect light from the respective one of the LEDs, the method comprising:
directing light from the first lighting unit toward the surface so that the light from the first lighting unit is directed substantially uniformly across the entire surface and wherein if one or more LEDs of the plurality of LEDs of the first lighting unit fails, remaining LEDs of the plurality of LEDs of the first lighting unit still substantially uniformly illuminate the surface; and
at the same time, directing light from the second lighting unit toward the surface so that the light from the second lighting unit is directed substantially uniformly across the surface, wherein if one or more LEDs of the plurality of LEDs of the second lighting unit fails, remaining LEDs of the plurality of LEDs of the second lighting unit still substantially uniformly illuminate the surface, wherein the directed light from both the first lighting unit and the second lighting unit is minimal beyond edges of the rectangular surface.

11. The method of claim 10, wherein the uniformity across the entire surface achieves at most a 3:1 ratio of the average illumination to the minimum illumination whether all or only some of the LEDs are operating.

12. The method of claim 10, wherein the method further comprises illuminating a second rectangular surface that is adjacent the surface using a third lighting unit and a fourth lighting unit that each include a circuit board, a plurality of LEDs arranged on the circuit board of the third and fourth lighting units, and a plurality of optical elements, each optical element of the plurality of optical elements of the third and fourth lighting units overlying a respective one of the LEDs of the third and fourth lighting units, the method further comprising:
at the same time as directing the light from the first and second lighting units, directing light from the third lighting unit toward the second surface such that the light from the third lighting unit is directed substantially uniformly across the entire second surface; and
at the same time, directing light from the fourth lighting unit toward the second surface such that the light from the fourth lighting unit is directed substantially uniformly across the entire second surface.

13. The method of claim 10, wherein the method further comprises the steps of illuminating the billboard display surface using a third lighting unit that includes a circuit board, a plurality of LEDs arranged on the circuit board of the third lighting unit, and a plurality of optical elements, each optical element of the plurality of optical elements of the third lighting unit overlying a respective one of the LEDs of the third lighting unit, the method further comprising:
at the same time as directing the light from the first and second lighting units, directing light from the third lighting unit toward the surface such that the light from the third lighting unit is directed substantially uniformly across the entire surface.

14. The method of claim 10, wherein surface comprises a portion of a billboard display surface extends from a left edge of the billboard display surface to a right edge of the billboard display surface so that all of the billboard display surface is illuminated by only the first and second lighting units without any additional lighting unit.

15. The method of claim 10, wherein each of the plurality of optical elements of the first lighting unit and of the second lighting unit are substantially the same.

16. The method of claim 10, wherein the entire surface is evenly illuminated even when multiple LEDs of the first lighting unit or the second lighting unit provide no illumination.

17. The method of claim 10, wherein the LEDs are arranged in a plurality of rows, the LEDs being arranged such that overlapping light from adjacent LEDs does not create interference patterns that result in dead spots on the surface.

18. The method of claim 10, wherein the optical elements each comprise a lens with a first part, a second part, and a third part, wherein the first part comprises a first curved surface, wherein the second part comprises a second curved surface that intersects with the first curved surface at a region between the first part and the second part, wherein the first part and the second part each have a peak relative to a circuit board of the associated LED, the peak being spaced from the region between the first part and the second part, and wherein the third part extends beyond the region between the first part and the second part in a direction away from the associated LED.

19. A method of illuminating a rectangular surface that includes a plurality of non-overlapping portions, the method comprising:
simultaneously illuminating each of the portions so that the entire surface is substantially uniformly lit;
wherein each portion is illuminated by a respective lighting assembly;
wherein each lighting assembly includes a plurality of LEDs and a plurality of optical elements proximate the plurality of LEDs; and
wherein, for each lighting assembly, when all LEDs of the lighting assembly are operating, the entire portion of the surface is illuminated with an illumination level and a uniformity, and wherein failure of one or more LEDs of the lighting assembly will cause the illumination level of light impinging the portion of the surface to decrease while the uniformity of light impinging the portion of the surface remains substantially the same.

20. The method of claim 19, wherein the uniformity across each portion achieves at most a 3:1 ratio of the average illumination to the minimum illumination whether all or only some of the LEDs are operating.

21. The method of claim 19, wherein the optical elements each comprise a lens with a first part, a second part, and a third part, wherein the first part comprises a first curved surface, wherein the second part comprises a second curved surface that intersects with the first curved surface at a region between the first part and the second part, wherein the first part and the second part each have a peak relative to a circuit board of the associated LED, the peak being spaced from the region between the first part and the second part, and wherein the third part extends beyond the region between the first part and the second part in a direction away from the associated LED.

22. The method of claim 19, wherein the LEDs are arranged in a plurality of rows, the LEDs being arranged such that overlapping light from adjacent LEDs does not create interference patterns that result in dead spots on the surface.

23. The method of claim 19, wherein the surface comprises a billboard display surface, wherein the plurality of portions comprises a first portion extending from a first edge of the billboard display surface to a center portion of the billboard display surface and a second portion extending from a second edge of the billboard display surface to the center portion of the billboard display surface.

* * * * *